(12) United States Patent
Shibata et al.

(10) Patent No.: US 12,547,373 B2
(45) Date of Patent: Feb. 10, 2026

(54) MULTIPLY AND ACCUMULATE CALCULATION DEVICE, NEUROMORPHIC DEVICE, AND MULTIPLY AND ACCUMULATE CALCULATION METHOD

(71) Applicant: TDK CORPORATION, Tokyo (JP)

(72) Inventors: Tatsuo Shibata, Tokyo (JP); Yukio Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1068 days.

(21) Appl. No.: 17/434,921

(22) PCT Filed: Mar. 1, 2019

(86) PCT No.: PCT/JP2019/008114
§ 371 (c)(1),
(2) Date: Aug. 30, 2021

(87) PCT Pub. No.: WO2020/178903
PCT Pub. Date: Sep. 10, 2020

(65) Prior Publication Data
US 2022/0138441 A1 May 5, 2022

(51) Int. Cl.
*G06F 7/544* (2006.01)
*G06G 7/32* (2006.01)
(Continued)

(52) U.S. Cl.
CPC ............. *G06F 7/5443* (2013.01); *G06G 7/32* (2013.01); *G06N 3/065* (2023.01); *H10B 61/00* (2023.02)

(58) Field of Classification Search
CPC .................................................. G06F 7/5443
See application file for complete search history.

(56) References Cited

U.S. PATENT DOCUMENTS 10,528,643 B1 * 1/2020 Choi ...................... G06F 17/16
10,891,108 B2 * 1/2021 Marukame .............. G11C 11/54
(Continued)

FOREIGN PATENT DOCUMENTS

WO    2018/034163 A1    2/2018

OTHER PUBLICATIONS

M. Hu, H. Li, Y. Chen, Q. Wu, G. S. Rose and R. W. Linderman, "Memristor Crossbar-Based Neuromorphic Computing System: A Case Study," in IEEE Transactions on Neural Networks and Learning Systems, vol. 25, No. 10, pp. 1864-1878, Oct. 2014, doi: 10.1109/TNNLS.2013.2296777. (Year: 2014).*
(Continued)

*Primary Examiner* — Emily E Larocque
*Assistant Examiner* — Markus Anthony Villanueva
(74) *Attorney, Agent, or Firm* — Oliff PLC

(57) ABSTRACT

A multiply and accumulate calculation device including a variable resistor array unit having a plurality of variable resistance elements, a reference array unit having a reference resistance element having a fixed resistance value, a signal input unit that generates an input signal from input data, and inputs the input signal to the variable and reference resistance elements, a first detection unit that detects a current flowing through the variable resistor array unit, based on the input signal applied to the variable resistance elements, a second detection unit that detects a current flowing through the reference array unit, based on the input signal applied to the reference resistance element, and a correction calculation unit that performs a predetermined calculation on the output from the first detection unit, based on the output from the second.

10 Claims, 9 Drawing Sheets

(51) Int. Cl.
    *G06N 3/065*    (2023.01)
    *H10B 61/00*    (2023.01)

(56) References Cited

U.S. PATENT DOCUMENTS

| | | | | |
|---|---|---|---|---|
| 12,061,877 | B2* | 8/2024 | Morie | G06F 7/5443 |
| 2018/0253643 | A1* | 9/2018 | Buchanan | G06F 7/5443 |
| 2019/0026627 | A1* | 1/2019 | Hatcher | G06N 3/04 |
| 2019/0034268 | A1* | 1/2019 | Roth | G06F 11/1068 |
| 2019/0042199 | A1* | 2/2019 | Sumbul | G11C 7/12 |
| 2019/0080230 | A1* | 3/2019 | Hatcher | G06F 7/5443 |
| 2019/0102359 | A1* | 4/2019 | Knag | G11C 11/418 |
| 2019/0171418 | A1 | 6/2019 | Morie et al. | |
| 2019/0205729 | A1* | 7/2019 | Tran | G06N 3/063 |
| 2019/0205741 | A1* | 7/2019 | Gupta | G06N 3/0464 |
| 2020/0349422 | A1* | 11/2020 | Tran | G06F 17/16 |
| 2021/0232900 | A1* | 7/2021 | Lee | G06N 3/084 |

OTHER PUBLICATIONS

P. Mazumder, S. M. Kang and R. Waser, "Memristors: Devices, Models, and Applications [Scanning the Issue]," in Proceedings of the IEEE, vol. 100, No. 6, pp. 1911-1919, Jun. 2012, doi: 10.1109/JPROC.2012.2190812. (Year: 2012).*

Wang, Quan, Hakaru Tamukoh, and Takashi Morie. "A time-domain analog weighted-sum calculation model for extremely low power VLSI implementation of multi-layer neural networks." arXiv preprint arXiv:1810.06819 (2018). (Year: 2018).*

S. R. Nandakumar, M. Le Gallo, I. Boybat, B. Rajendran, A. Sebastian and E. Eleftheriou, "Mixed-precision architecture based on computational memory for training deep neural networks," 2018 IEEE International Symposium on Circuits and Systems (ISCAS), Florence, Italy, 2018, pp. 1-5. (Year: 2018).*

Mittal, Sparsh. (2018). A Survey of ReRAM-Based Architectures for Processing-In-Memory and Neural Networks. Machine Learning and Knowledge Extraction. 1. 10.3390/make1010005. (Year: 2018).*

Burr et al., "Neuromorphic computing using non-volatile memory," Advances in Physics: X, 2017, vol. 2, No. 1, pp. 89-124.

Narayanan et al., "Reducing Circuit Design Complexity for Neuromorphic Machine Learning Systems Based on Non-Volatile Memory Arrays," 2017 International Symposium on Circuits and Systems, 2017.

Narayanan et al., "Toward on-chip acceleration of the backpropagation algorithm using nonvolatile memory," IBM J. Res. & Dev., 2017, vol. 61, No. 4/5, Paper 11, pp. 1-11.

May 21, 2019 International Search Report issued in International Patent Application No. PCT/JP2019/008114.

* cited by examiner

MULTIPLY AND ACCUMULATE CALCULATION DEVICE, NEUROMORPHIC DEVICE, AND MULTIPLY AND ACCUMULATE CALCULATION METHOD

TECHNICAL FIELD

The present invention relates to a multiply and accumulate calculation device, a neuromorphic device, and a multiply and accumulate calculation method.

BACKGROUND ART

In recent years, attempts to achieve a neural network that imitates a nervous system at a device level by using a variable resistance element have become active. In a basic neural network, an output is obtained by multiplying input data by weights, and inputting the value of sum of all multiplications to an activation function. Therefore, a method is being studied which achieves a multiply and accumulate calculation in an analog manner at a hardware level, by combining a plurality of variable resistance elements having continuously changing resistance values, and summing the current values output from the variable resistance elements.

Specifically, by implementing the coupling between the layers of the neural network with an array of variable resistance elements, and applying a voltage or pulse-length modulated input signal to the array, the amount of current flowing through the bit line is used as a Σ result of a multiply and accumulate calculation. In this case, the array of variable resistance elements functions as an analog multiply and accumulate calculation device.

For example, Non Patent Document 1 discloses a method of performing the calculation of a neural network by using a memristor (ReRAM, PCM, spin, or the like).

Further, Patent Document 1 discloses a method of assigning an element array according to a sign of a weight of a neural network.

Non Patent Document 2 discloses a method of expressing one weight of a neural network as positive and negative weights by using two elements. The resistor change characteristics of the PCM elements are asymmetrical, so that the motivation is to assign the up/down movements during learning to different elements.

CITATION LIST

Patent Document

[Patent Document 1]
PCT International Publication No. WO2018/034163

Non Patent Documents

[Non Patent Document 1]
G. W. Burr et al., Advanced in Physics: X, 2, 89 (2017)
[Non Patent Document 2]
P. Narayanan, et al., "Reducing Circuit Design Complexity for Neuromorphic Machine Learning Systems Based on Non-Volatile Memory Arrays," in 2017 International Symposium on Circuits and Systems, May 2017

Technical Problem

In the calculation of the neural network disclosed in Non Patent Document 1 and the like, the connection weight of the neural network is 0 or has a positive or negative value. However, variable resistance elements cannot have negative conductance. Therefore, as in the technique of Patent Document 1, a method is adopted in which an element that stores a positive weight and an element that stores a negative weight are divided, the sum of weights is detected separately, and then a result difference is used for calculation. However, a mechanism for selecting which element stores each of the positive and negative weights in the neural network is required, which complicates the apparatus. Further, even when learning progresses, the sign of the weight range is fixed, so that the discrimination rate may not increase sufficiently.

Further, as in the technique of Non Patent Document 2, there is a method of allocating two elements corresponding to positive and negative weights due to the factor of the element characteristics and storing the positive and negative values of each element, but the physical size of the array becomes large, and a circuit for comparing positive and negative outputs is required for each output column pair, which complicates and increases the size of the apparatus. Further, when one of the positive and negative values in each element reaches the upper or lower limit, it is necessary to reset both of the two elements, which causes a problem in handleability.

An object of the present invention is to provide a multiply and accumulate calculation device, a neuromorphic device, and a multiply and accumulate calculation method that can perform a calculation in consideration of positive and negative weights by one element, and can achieve simplification and miniaturization of the apparatus.

Solution to Problem

In order to achieve the above object, the present invention provides the following means.

[1] A multiply and accumulate calculation device including:
a variable resistor array unit having a plurality of variable resistance elements; a reference array unit having a reference resistance element having a fixed resistance value;
a signal input unit configured to generate an input signal from input data, and input the input signal to the plurality of variable resistance elements and the reference resistance element;
a first detection unit configured to detect a current flowing through the variable resistor array unit, based on the input signal applied to the plurality of variable resistance elements;
a second detection unit configured to detect a current flowing through the reference array unit, based on the input signal applied to the reference resistance element; and
a correction calculation unit configured to perform a predetermined calculation on the output from the first detection unit, based on the output from the second detection unit.

[2] The multiply and accumulate calculation device according to [1], further including:
a first conversion unit configured to digitally convert the output from the first detection unit and output the converted output to the correction calculation unit; and
a second conversion unit configured to digitally convert the output from the second detection unit and output the converted output to the correction calculation unit, in which
the correction calculation unit subtracts a value obtained by multiplying the output from the second conversion unit by a predetermined coefficient, from the output from the first conversion unit, and further multiplies a value obtained from the subtraction by a predetermined coefficient.

[3] The multiply and accumulate calculation device according to [2], in which the output of the correction calculation unit is determined by the following equation.

(Output of the correction calculation unit)={(Output of the first detection unit)−(Output of the second detection unit)×K1}×K2 here, K1 and K2 are coefficients

[4] The multiply and accumulate calculation device according to [1], in which the correction calculation unit includes an amplifier circuit configured to amplify one or both of the output from the first detection unit and the output from the second detection unit, and a difference output circuit configured to output a difference between the output from the first detection unit and the output from the second detection unit, and the correction calculation unit outputs a value corresponding to a difference between values obtained by multiplying the output from the first detection unit and the output from the second detection unit by a predetermined coefficient.

[5] The multiply and accumulate calculation device according to any one of [1] to [4], in which the signal input unit inputs a pulse width modulation signal based on the input data, and the first detection unit and the second detection unit each have a detection circuit based on a charge detection method.

[6] The multiply and accumulate calculation device according to any one of [1] to [4], in which the signal input unit inputs a pulse amplitude modulation signal, based on the input data, and the first detection unit and the second detection unit each have a detection circuit based on a current detection method.

[7] The multiply and accumulate calculation device according to any one of [1] to [6], further including:

a plurality of variable resistor columns each including the plurality of the variable resistance elements, and a plurality of the first detection units configured to detect currents flowing through the plurality of variable resistor columns, in which one correction calculation unit performs a calculation on a plurality of outputs from the plurality of first detection units.

[8] The multiply and accumulate calculation device according to [1], in which the reference array unit includes a reference column having a plurality of the reference resistance elements.

[9] The multiply and accumulate calculation device according to [1], in which the reference array unit includes a reference row having a plurality of the reference resistance elements.

[10] The multiply and accumulate calculation device according to any one of [1] to [9], in which the variable resistance element is a magnetoresistance effect element.

[11] A multiply and accumulate calculation device including:

a variable resistor array unit having a plurality of variable resistance elements;

a first reference array unit including a reference column having a reference resistance element having a fixed resistance value;

a second reference array unit including a reference row having a reference resistance element having a fixed resistance value;

a first signal input unit connected to an input side of the variable resistor array unit, and configured to generate a first input signal from input data, and input the first input signal to the plurality of variable resistance elements and the reference resistance elements of the reference column;

a first detection unit connected to an output side of the variable resistor array unit, and configured to detect a current flowing through the variable resistor array unit, based on the first input signal applied to the plurality of variable resistance elements;

a second detection unit connected to the output side of the variable resistor array unit, and configured to detect a current flowing through the first reference array unit, based on the first input signal applied to the reference resistance elements of the reference column;

a second signal input unit connected to the output side of the variable resistor array unit, and configured to generate a second input signal from input data, and input the second input signal to the plurality of variable resistance elements and the reference resistance elements of the reference row;

a third detection unit connected to the input side of the variable resistor array unit, and configured to detect a current flowing through the variable resistor array unit, based on the second input signal applied to the plurality of variable resistance elements;

a fourth detection unit connected to the input side of the variable resistor array unit, and configured to detect a current flowing through the second reference array unit, based on the second input signal applied to the reference resistance elements of the reference row;

a first correction calculation unit configured to perform a predetermined calculation on the output from the first detection unit, based on the output from the second detection unit;

a second correction calculation unit configured to perform a predetermined calculation on the output from the third detection unit, based on the output from the fourth detection unit;

a first input/output switching unit connected to the input side of the variable resistor array unit, and configured to switch between an input from the first signal input unit and an output to the third detection unit; and a second input/output switching unit connected to the output side of the variable resistor array unit, and configured to switch between an input from the second signal input unit and an output to the first detection unit.

[12] The multiply and accumulate calculation device according to [11], further including:

a first conversion unit configured to digitally convert the output from the first detection unit and output the converted output to the first correction calculation unit; and a second conversion unit configured to digitally convert the output from the second detection unit and output the converted output to the first correction calculation unit, in which the first correction calculation unit subtracts a value obtained by multiplying the output from the second detection unit by a predetermined coefficient, from the output from the first detection unit, and further multiplies a value obtained from the subtraction by a predetermined coefficient.

[13] The multiply and accumulate calculation device according to [12], in which the output of the first correction calculation unit is determined by the following Equation (1), (Output of the first correction calculation unit)={(Output of the first detection unit)−(Output of the second detection unit)×K1}×K2　　(1)

here, K1 and K2 are coefficients.

[14] The multiply and accumulate calculation device according to [11], in which the first correction calculation unit includes a first amplifier circuit configured to amplify one or both of the output from the first detection unit and the output from the second detection unit, and a first difference output circuit configured to output a difference between the output from the first detection unit and the output from the second detection unit, and outputs a value corresponding to a difference between values obtained by multiplying the output from the first detection unit and the output from the second detection unit by a predetermined coefficient.

[15] The multiply and accumulate calculation device according to any one of [11] to [14], in which the first signal input unit inputs a pulse width modulation signal based on the input data, and the first detection unit and the second detection unit each have a detection circuit based on a charge detection method.

[16] The multiply and accumulate calculation device according to any one of [11] to [14], in which the first signal input unit inputs a pulse amplitude modulation signal, based on the input data, and the first detection unit and the second detection unit each have a detection circuit based on a current detection method.

[17] The multiply and accumulate calculation device according to any one of [11] to [16], further including:

a plurality of variable resistor columns each including the plurality of the variable resistance elements; and a plurality of the first detection units configured to detect currents flowing through the plurality of variable resistor columns, based on the first input signal, in which the first correction calculation unit performs a calculation on a plurality of outputs from the plurality of first detection units.

[18] The multiply and accumulate calculation device according to [11], further including:

a third conversion unit configured to digitally convert the output from the third detection unit and output the converted output to the second correction calculation unit; and a fourth conversion unit configured to digitally convert the output from the fourth detection unit and output the converted output to the second correction calculation unit, in which the second correction calculation unit subtracts a value obtained by multiplying the output from the fourth detection unit by a predetermined coefficient, from the output from the third detection unit, and further multiplies a value obtained from the subtraction by a predetermined coefficient.

[19] The multiply and accumulate calculation device according to [11], in which the second correction calculation unit includes a second amplifier circuit configured to amplify one or both of the output from the third detection unit and the output from the fourth detection unit, and a second difference output circuit configured to output a difference between the output from the third detection unit and the output from the fourth detection unit, and outputs a value corresponding to a difference between values obtained by multiplying the output from the third detection unit and the output from the fourth detection unit by a predetermined coefficient.

[20] A neuromorphic device including the multiply and accumulate calculation device according to any one of the [1] to [19].

[21] A multiply and accumulate calculation method including: an input step of generating an input signal from input data, inputting the input signal to a plurality of variable resistance elements constituting a variable resistor array unit, and outputting the input signal to a reference resistance element having a fixed resistance value and constituting a reference array unit;

a detection step of detecting a current flowing through the variable resistor array unit, based on the input signals applied to the plurality of variable resistance elements, and detecting a current flowing through the reference array unit, based on the input signal applied to the reference resistance elements; and a correction calculation step of performing a predetermined calculation on an output according to a detection result of the current flowing through the variable resistor array unit, based on the output according to a detection result of the current flowing through the reference array unit.

Advantageous Effects of Invention

According to the present invention, it is possible to perform a calculation in consideration of positive and negative weights by one element, and it is possible to achieve simplification and miniaturization of the apparatus.

DESCRIPTION OF EMBODIMENTS

Hereinafter, embodiments of the present invention will be described in detail with reference to the drawings.

[Configuration of Multiply and Accumulate Calculation Device According to First Embodiment]

Figure 1:
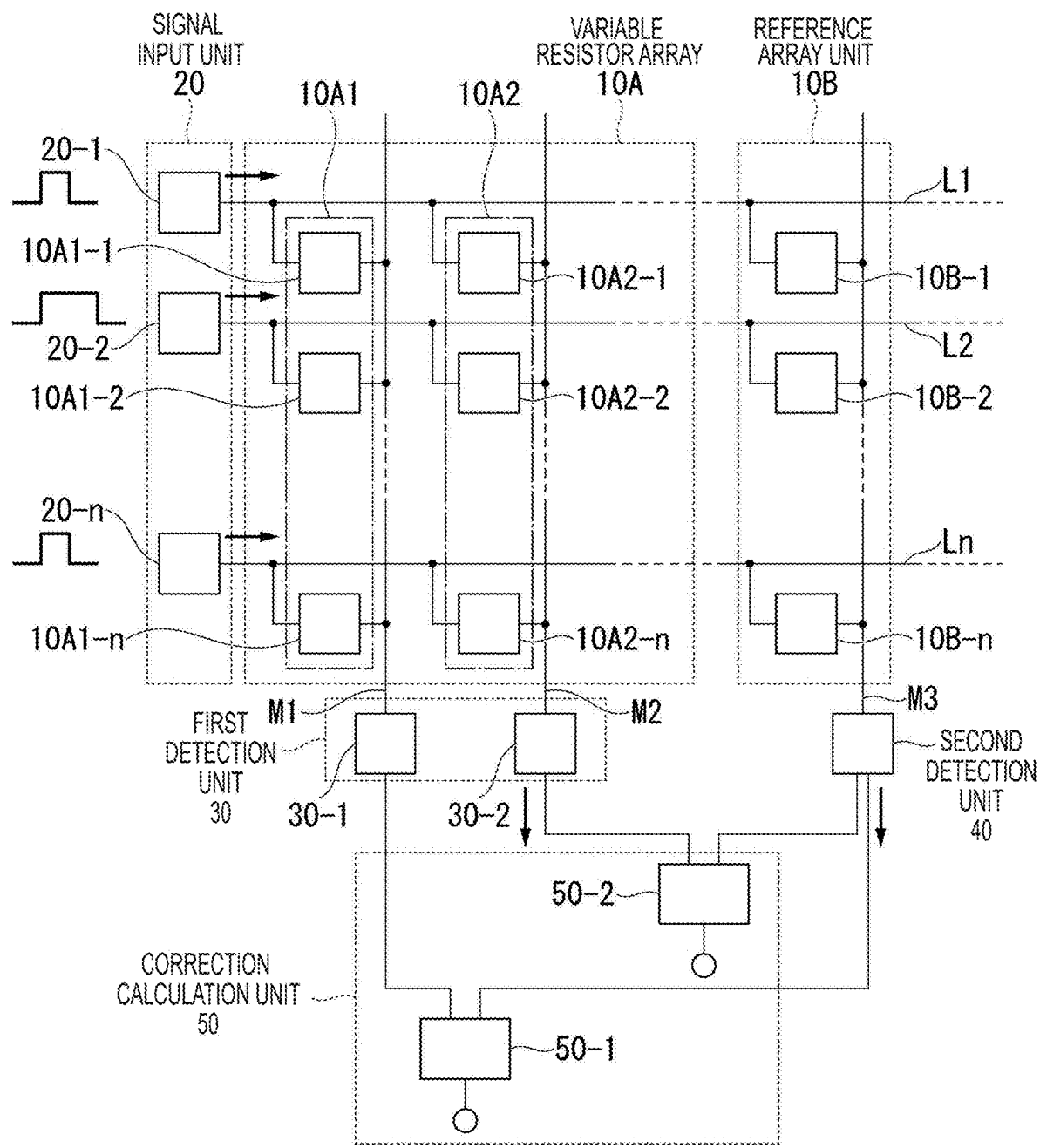
FIG. 1 is a diagram representing an example of a configuration of a multiply and accumulate calculation device of a first embodiment of the present invention.

FIG. 1 is a diagram representing an example of a configuration of a multiply and accumulate calculation device of a first embodiment of the present invention.

As shown in FIG. 1, the multiply and accumulate calculation device 1 includes a variable resistor array unit 10A, a reference array unit 10B, a signal input unit 20, a first detection unit 30, a second detection unit 40, and a correction calculation unit 50.

The variable resistor array unit 10A has a plurality of variable resistor columns 10A1, 10A2, . . . . The variable resistor column 10A1 includes a plurality of variable resistance elements 10A1-1, 10A1-2, . . . , and 10A1-$n$ (n is a natural number). Further, the variable resistor column 10A2 includes a plurality of variable resistance elements 10A2-1, 10A2-2, . . . , and 10A2-$n$ (n is a natural number). In the variable resistor array unit 10A, the result of the multiply and accumulate calculation is output for each of the variable resistor columns, according to the conductivity G of each variable resistance element.

In FIG. 1, the variable resistor array unit 10A has two variable resistor columns 10A1 and 10A2, but without being limited to this, it may have one variable resistor column, or three or more variable resistor columns. Further, the variable resistor columns 10A1 and 10A2 each have three variable resistance elements, but without being limited to this, it may have one or two variable resistance elements, or four or more variable resistance elements.

The variable resistance element is not particularly limited, but, for example, is a magnetoresistance effect element with variable resistance using the magnetoresistance effect. Examples of the magnetoresistance effect element include a tunneling magnetoresistance effect (TMR) element and a giant magnetoresistance effect (GMR) element. In particular, a three-terminal magnetoresistance effect element using a domain wall is preferably used as a variable resistance element because the symmetry of resistor conversion is good.

The reference array unit 10B includes a reference array having a plurality of reference resistance elements 10B-1, 10B-1, . . . , 10B-n (n is a natural number) having a fixed resistance value. In the reference array unit 10B, since the resistance value of each reference resistance element is fixed, a unique output is produced according to the input signal (input value).

Each of the reference resistance elements may be used as a resistor element having a substantially fixed resistance value by first setting the variable resistance element to the same set value and then not changing the set value, or as a fixed resistor element manufactured so as to have the same resistance value physically.

Further, in FIG. 1, the reference array unit 10B has a plurality of reference resistance elements 10B-1, 10B-1, . . . , and 10B-n (n is a natural number), but without being limited to this, may have one reference resistance element.

In the present embodiment, the reference array unit 10B is a reference column having the plurality of reference resistance elements 10B-1, 10B-1, . . . , and 10B-n. With this reference column, it is possible to make necessary corrections during the multiply and accumulate calculation.

The signal input unit 20 generates an input signal from the input data, and inputs the input signal to the plurality of variable resistance elements and the plurality of reference resistance elements. In the present embodiment, the signal input unit 20 includes a plurality of signal input units 20-1, 20-2, . . . , 20-$n$ (n is a natural number). The signal input unit 20-1 is connected to a plurality of variable resistance elements 10A1-1, 10A2-1, . . . , and a reference resistance element 10B-1 via a line L1. The signal input unit 20-2 is connected to a plurality of variable resistance elements 10A1-2, 10A2-2, . . . , and a reference resistance element 10B-2 via a line L2. Further, the signal input unit 20-$n$ is connected to a plurality of variable resistance elements 10A1-$n$, 10A2-$n$, . . . , and a reference resistance element 10B-n via a line Ln.

Then, the signal input unit 20-1 outputs the input signal to the plurality of variable resistance elements 10A1-1, 10A2-1, . . . , and the reference resistance element 10B-1. The signal input unit 20-2 also outputs the input signal to the plurality of variable resistance elements 10A1-2, 10A2-2, . . . , and the reference resistance element 10B-2 in the same manner as described above. The signal input unit 20-$n$ also outputs the input signal to the plurality of variable resistance elements 10A1-$n$, 10A2-$n$, . . . , and the reference resistance element 10B-n in the same manner as described above.

In FIG. 1, the signal input unit 20 includes a plurality of signal input units 20-1, 20-2, . . . , 20-$n$ (n is a natural number), but without being limited to this, it may include a single signal input unit.

The input signal for the plurality of variable resistance elements and the reference resistance element is, for example, a pulse width modulation signal (hereinafter, also referred to as a PWM signal) or a pulse amplitude modulation signal (hereinafter, also referred to as a PAM signal). At this time, the signal input unit 20 inputs a PWM signal or a PAM signal based on the input data.

The first detection unit 30 detects the current flowing through the variable resistor array unit 10A, based on the input signals applied to the plurality of variable resistance elements. In the present embodiment, the first detection unit 30 includes a plurality of first detection units 30-1, 30-2, . . . . The first detection unit 30-1 is connected to a plurality of variable resistance elements 10A1-1, 10A1-2, 10A1-$n$ via a line M1. The first detection unit 30-2 is connected to a plurality of variable resistance elements 10A2-1, 10A2-2, 10A2-$n$ via a line M2.

Then, the first detection unit 30-1 detects the current flowing through the variable resistor column A1, based on the input signals applied to the plurality of variable resistance elements 10A1-1, 10A1-2, . . . , 10A1-$n$. Similarly to the above, the first detection unit 30-2 detects the current flowing through the variable resistor column 10A2, based on the input signals applied to the plurality of variable resistance elements 10A2-1, 10A2-2, 10A2-$n$ (n is a natural number). That is, the plurality of first detection units 30-1, 30-2, . . . detect the currents flowing through the plurality of variable resistor columns 10A1, 10A2, . . . , based on the input signals.

In FIG. 1, the first detection unit 30 includes a plurality of first detection units 30-1, 30-2, . . . , but without being limited thereto, it may include a single first detection unit.

When the signal input unit 20 inputs a PWM signal based on the input data, the first detection unit 30 can have a detection circuit based on a charge detection method. Further, when the signal input unit 20 inputs a PAM signal based on the input data, the first detection unit 30 can have a detection circuit based on a current detection method. That is, when the input signal is a PWM signal, the output voltage value by charge detection can be used, and when the input signal is a PAM signal, the output voltage value by current detection can be used.

The second detection unit 40 detects the current flowing through the reference array unit 10B, based on the input signals applied to the plurality of reference resistance elements. The second detection unit 40 is connected to the reference resistance elements 10B-1 to 10B-n via the line M3. Then, the second detection unit 40 detects the current flowing through the reference array unit 10B, based on the input signal applied to any one of the plurality of reference resistance elements 10B-1 to 10B-n.

When the signal input unit 20 inputs a PWM signal based on the input data, the second detection unit 40 can have a detection circuit based on a charge detection method. Further, when the signal input unit 20 inputs a PAM signal based on the input data, the second detection unit 40 can have a detection circuit based on a current detection method.

The correction calculation unit 50 performs a predetermined calculation on the output from the first detection unit 30, based on the output from the second detection unit 40. In the present embodiment, the correction calculation unit 50 includes a plurality of correction calculation units 50-1, 50-2, . . . . The correction calculation unit 50-1 is connected to the first detection unit 30-1 and the second detection unit 40, and the correction calculation unit 50-2 is connected to the first detection unit 30-2 and the second detection unit 40. Then, the correction calculation unit 50-1 performs a predetermined calculation on the output of the first detection unit 30-1, based on the output from the second detection unit 40. In the same manner as described above, the correction calculation unit 50-2 also performs a predetermined calculation on the output of the first detection unit 30-2, based on the output from the second detection unit 40.

Figure 2:
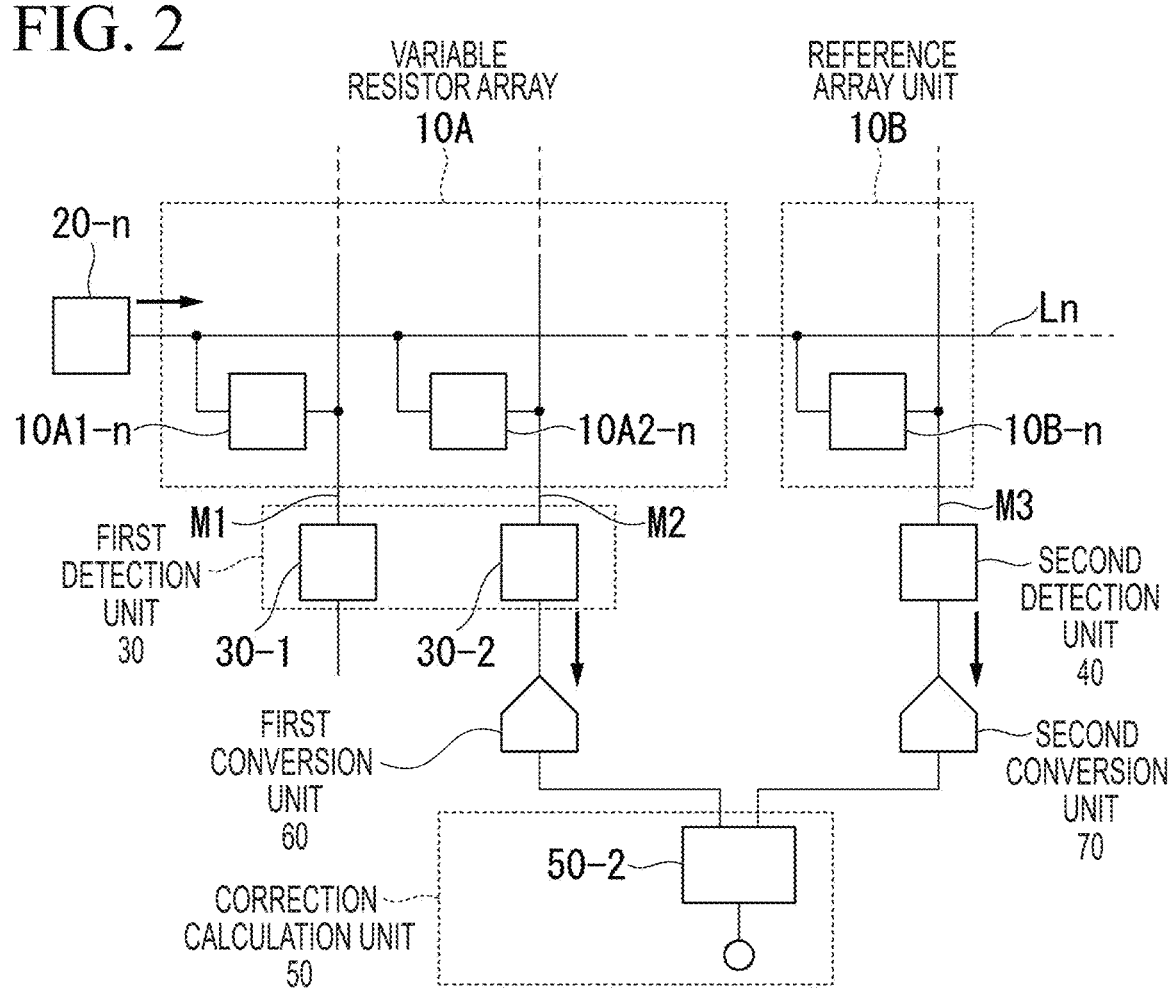
FIG. 2 is a diagram representing an example of a configuration when a correction calculation unit in FIG. 1 performs a digital process.

FIG. 2 is a diagram representing an example of a configuration when the correction calculation unit 50 in FIG. 1 performs a digital process.

When the correction calculation unit 50 performs a digital process, the multiply and accumulate calculation device 1 can further include, for example, a first conversion unit 60 that digitally converts the output from the first detection unit 30 (for example, the first detection unit 30-2) and outputs the converted output to the correction calculation unit 50 (for example, the correction calculation unit 50-2), and a second conversion unit 70 that digitally converts the output from the second detection unit 40 and outputs the converted output to the correction calculation unit 50 (for example, the correction calculation unit 50-2).

At this time, the correction calculation unit 50 performs a digital logical calculation, subtracts a value obtained by multiplying the output from the second detection unit 40 by a predetermined coefficient, from the output from the first conversion unit 60, and further multiplies the value obtained from the subtraction by the predetermined coefficient.

Specifically, the output of the correction calculation unit 50 is determined by the following Equation (1). Analytical correction values can be obtained by this equation, and theoretical correction calculations are possible, $$(\text{Output of correction calculation unit 50}) = \{(\text{Output of first detection unit 30}) - (\text{Output of second detection unit 40}) \times K1\} \times K2 \quad (1)$$

here, K1 and K2 are coefficients.

In this way, since the correction result is obtained by the above Equation (1), based on the outputs from the first detection unit 30 and the second detection unit 40, through the digital process by the correction calculation unit 50, the multiply and accumulate calculation including positive and negative can be performed by one variable resistance element (for example, variable resistance element 10A1-1), and the correction with high accuracy can be performed through the digital calculation.

Figure 3:
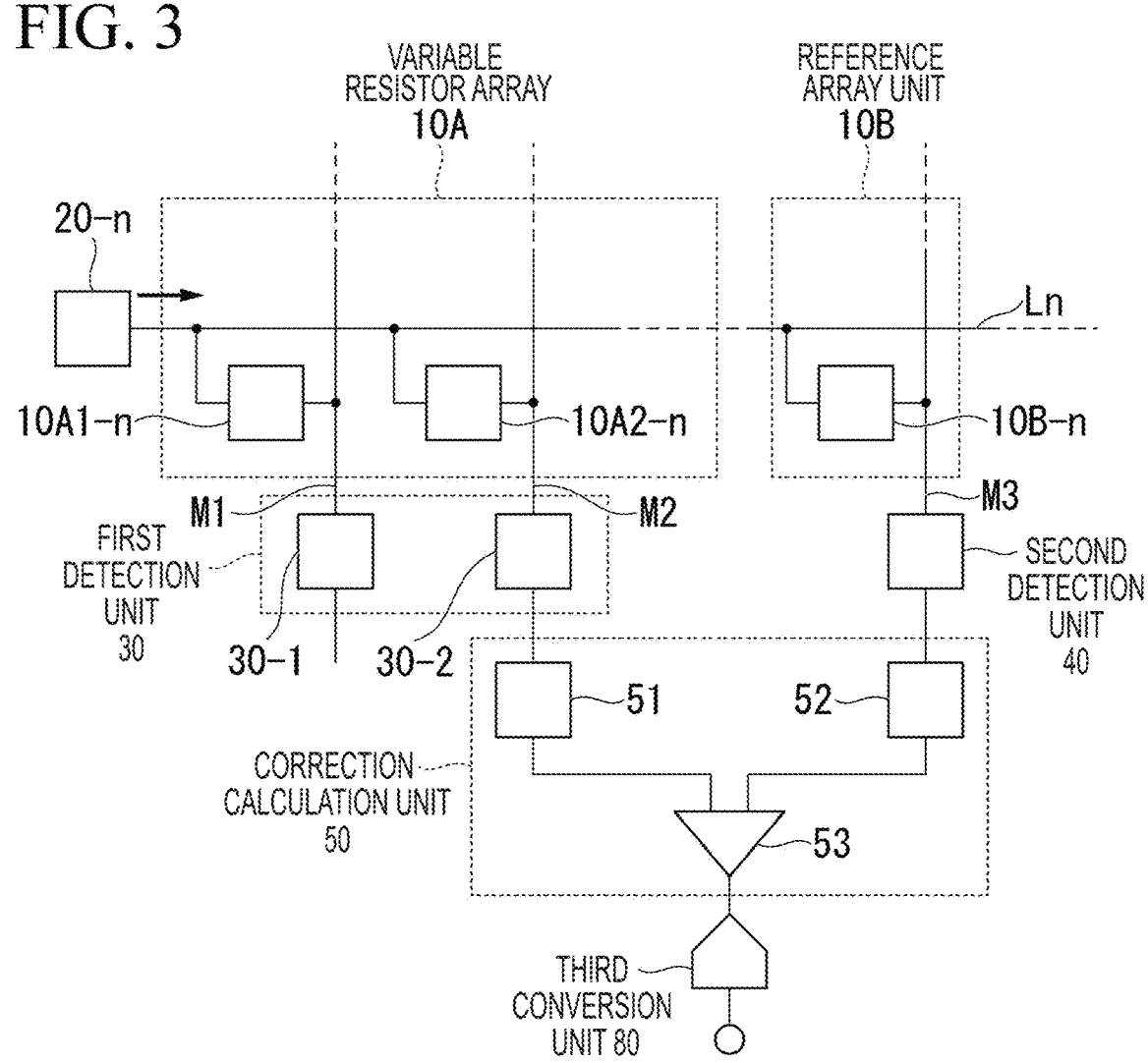
FIG. 3 is a diagram showing an example of a configuration when the correction calculation unit in FIG. 1 performs an analog process.

FIG. 3 is a diagram showing an example of a configuration when the correction calculation unit 50 in FIG. 1 performs an analog process.

When the correction calculation unit 50 performs an analog process, the correction calculation unit 50 includes, for example, amplifier circuits 51 and 52 (first amplifier circuit) that amplifies the output from the first detection unit 30 (for example, the first detection unit 30-2) and the output from the second detection unit 40, and a difference output circuit 53 (first difference detection circuit) that outputs a difference between the output from the first detection unit 30 and the output from the second detection unit 40. A third conversion unit 80 that digitally converts the output from the difference output circuit 53 is connected to the difference output circuit 53.

At this time, the correction calculation unit 50 outputs a value corresponding to a difference between values obtained by multiplying the output from the first detection unit 30 and the output from the second detection unit 40 by a predetermined coefficient. The final correction result can also be obtained by such an analog process of the correction calculation unit 50.

In the present embodiment, the correction calculation unit 50 has two amplifier circuits 51 and 52, but without being limited to this, it may have one of the amplifier circuits 51 and 52 for amplifying the output from the first detection unit 30 (for example, the first detection unit 30-2) and the output from the second detection unit 40.

[Operation of Multiply and Accumulate Calculation Device According to the First Embodiment]

Figure 4:
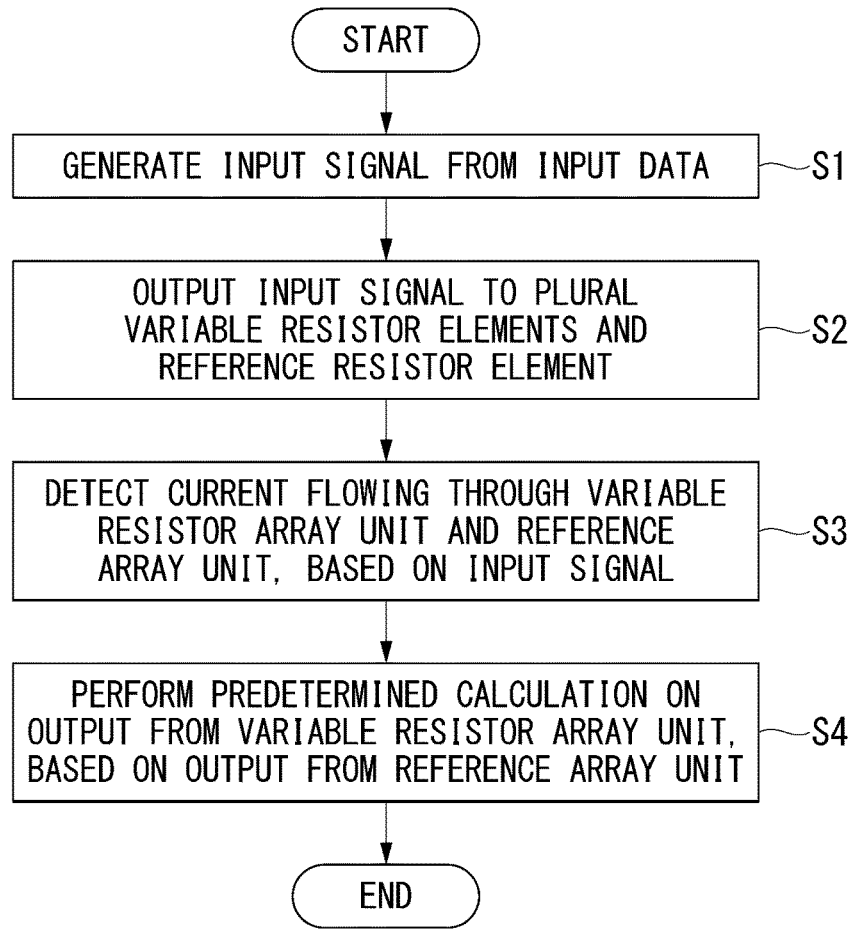
FIG. 4 is a flowchart showing an example of a multiply and accumulate calculation method executed by the multiply and accumulate calculation device of FIG. 1.

FIG. 4 is a flowchart showing an example of a multiply and accumulate calculation method executed by the multiply and accumulate calculation device 1 of FIG. 1.

As shown in FIG. 4, first, the signal input unit 20 generates an input signal from input data (step S1), inputs the input signal to a plurality of variable resistance elements (for example, 10A1-1 to 10A1-n) constituting a variable resistor array unit 10A, and inputs the input signal to a reference resistance element (for example, 10B-1) having a fixed resistance value (step S2).

When the input signal is, for example, a PWM signal, the signal input unit 20 inputs the PWM signal based on the input data. When the input signal is a PAM signal, the signal input unit 20 inputs the PAM signal based on the input data.

As described above, in the present embodiment, the input signal is input as the PWM signal or the PAM signal almost at the same time to the variable resistor array unit 10A that performs the multiply and accumulate calculation and the reference array unit 10B that calculates the correction value.

When the input signal is input to the variable resistor array unit 10A, the variable resistor array unit 10A outputs the result of the multiply and accumulate calculation, depending on the conductivity G of each of the variable resistance elements (for example, 10A1-1, 10A1-2, . . . , and 10A1-n). When the input signal is input to the reference array unit 10B, each reference resistance element (for example, 10B-1) outputs a unique output value according to the input value of the input signal.

Next, the first detection unit 30 detects the current flowing through the variable resistor array unit 10A based on the input signals applied to the plurality of variable resistance elements (for example, 10A1-1 to 10A1-n), and also detects the current flowing through the reference array unit 10B based on the input signal applied to the reference resistance element (for example, 10B-1) (step S3).

After that, the correction calculation unit 50 performs a predetermined calculation on an output according to a detection result of the current flowing through the variable resistor array unit 10A, based on the output according to a detection result of the current flowing through the reference array unit 10B (step S4). For example, based on the outputs from the first detection unit 30 and the second detection unit 40, as a predetermined calculation, the output of the correction calculation unit 50, that is, the correction result is obtained by, for example, the above Equation (1).

Next, the principle that the correction result can be obtained by the above Equation (1) will be described.

Figure 5:
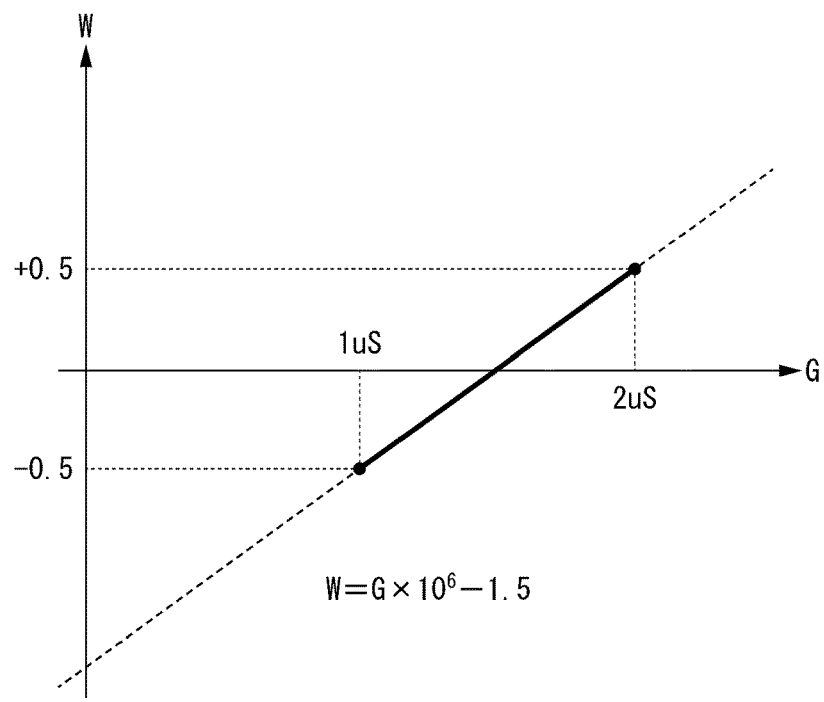
FIG. 5 is a diagram representing a correlation between a conductance G and weight W of a variable resistance element.

The conductance G (unit: S (=1/Ω)) of the variable resistance element is a constant determined based on the physical properties, and the changeable range is determined. Therefore, for example, it is assumed that the conductance G of the variable resistance element can be changed only in the range of 1 μS to 2 μS. On the other hand, the range represented by the weight W varies depending on the specification, but is set to include a positive range and a negative range centered on 0, for example, −0.5 to +0.5 (or −1.0 to +1.0). In this case, the range represented by the weight W is assigned to the range of conductance G. In the case of the example of FIG. 5, the conductance G is represented by the following Equation (2) from the correlation between the conductance G and the weight W.

$$G = (W + 1.5) \times 10^{-6} \quad (2)$$

Since the conductance G and the weight W of the variable resistance element has a relationship of $W = G \times 10^6 - 1.5$, when obtaining W×(Input), both sides of the above Equation (2) are multiplied by (Input) to obtain the following equation.

$$W \times (\text{Input}) = G \times (\text{Input}) \times 10^6 - 1.5 \times (\text{Input}) \quad (3)$$

Therefore, if (Input) is known, W×(Input) can be obtained from the above Equation (3).

Then, by inputting the input signal to the reference resistance element having a fixed resistance value, the output from the reference resistance element and the outputs of the variable resistance elements are read. The value of the conductance G (hereinafter, also referred to as G_Ref) of the reference resistance element is a fixed value like the resistance value, and is not particularly limited as long as it can be taken, but it is desirable that the value is the maximum value or the minimum value from the viewpoint of stability. For example, in the case of the example of FIG. 5, (G_Ref) can be set to 1 μS, which is the minimum value. Thus, the sum of (G_Ref)×(input value), that is, (G_Ref)×(sum of input values) is obtained. Thus, (sum of the input value) can be obtained by detecting the output from the reference column including the reference resistance elements and dividing the output from the reference column by (G_Ref).

In the actual detection, the output from the variable resistor column including the variable resistance elements representing the weight W and the output from the reference column are detected, and from the relationship of the above Equation (3), and (G_Ref)=1 μS, $$W \times (\text{Input}) = G \times (\text{Input}) \times 10^6 - 1.5 \times (\text{Input}) =$$

$$(\text{Output from variable resistor column}) \times 10^6 -$$

$$1.5 \times (\text{Output from reference column}) \div (\text{G\_Ref}) =$$

$$(\text{Output from variable resistor column}) \times 10^6 -$$

$$1.5 \times (\text{Output from reference column}) \times 10^6 =$$

$$\{(\text{Output from variable resistor column}) -$$

$$1.5 \times (\text{Ouput from reference column})\} \times 10^6$$

In the above equation, W×(Input) corresponds to the output from the correction calculation unit, (output from the variable resistor column) corresponds to (output from the first detection unit), and (output from the reference column) corresponds to (output from the second detection unit). Further, "1.5" corresponds to the coefficient K1 and "$10^6$" corresponds to the coefficient K2. Therefore, the output (correction result) of the correction calculation unit can be obtained from the above Equation (1).

Next, a specific example of the correction result obtained by using the above Equation (1) will be given.

The following five specific examples assume a multiply and accumulate calculation device including a variable resistor column having five variable resistance elements, and a reference column having five reference resistance elements.

Specific Example 1

Table 1 shows a case where Gmin is used as (G_Ref) and the range of G is 1 μS to 2 μS. In Table 1, the value "0.0000025" at the bottom of "Input/MAC" is the value (output of the reference column) obtained by multiplying the input value (Input) by the fixed value (G_Ref), and the value "4.05E-06" at the bottom of "DW/MAC" is the value (output of the variable resistor column) obtained by multiplying the input value by the weight W. Then, the value at the bottom of "Comp.MAC" is the calculation result (output from the correction calculation unit) of correction by using the value from (G_Ref). In this case, it can be seen that the output "0.3" of the correction calculation unit can be obtained.

TABLE 1

| Input case1 | Ideal | | Input | | DW | | |
|---|---|---|---|---|---|---|---|
| | Weight | MAC | G_ref | MAC | G_weight | MAC | Comp. MAC |
| 1 | 0.4 | −0.2 | −0.08 | 0.000001 | 0.0000004 | 0.0000013 | 5.2E−07 |
| 2 | 0.1 | −0.4 | −0.04 | 0.000001 | 0.0000001 | 0.0000011 | 1.1E−07 |
| 3 | 0.2 | 0 | 0 | 0.000001 | 0.0000002 | 0.0000015 | 0.0000003 |
| 4 | 0.8 | −0.1 | −0.08 | 0.000001 | 0.0000008 | 0.0000014 | 1.12E−06 |
| 5 | 1 | 0.5 | 0.5 | 0.000001 | 0.000001 | 0.000002 | 0.000002 |
| sum | 2.5 | −0.2 | 0.3 | | 0.0000025 | | 4.05E−06 | 0.3 |

Specific Example 2

Table 2 shows a case where the ranges of (G_Ref) and G are the same as in Specific Example 1 and the input values input to the five variable resistance elements are changed. From the results in Table 2, it can be seen that the output "0.06" of the correction calculation unit can be obtained even if the input values are different.

TABLE 2

| Input case1 | Ideal Weight | MAC | Input G_ref | MAC | DW G_weight | MAC | Comp. MAC |
|---|---|---|---|---|---|---|---|
| 1 | 0.2 | −0.2 | −0.04 | 0.000001 | 0.0000002 | 0.0000013 | 2.6E−07 |
| 2 | 0 | −0.4 | 0 | 0.000001 | 0 | 0.0000011 | 0 |
| 3 | 0.1 | 0 | 0 | 0.000001 | 0.0000001 | 0.0000015 | 1.5E−07 |
| 4 | 0.5 | −0.1 | −0.05 | 0.000001 | 0.0000005 | 0.0000014 | 0.0000007 |
| 5 | 0.3 | 0.5 | 0.15 | 0.000001 | 0.0000003 | 0.000002 | 0.0000006 |
| sum | 1.1 | −0.2 | 0.06 | | 0.0000011 | | 1.71E−06 | 0.06 |

Specific Example 3

Table 3 shows a case where the ranges of (G_Ref) and G, and the input values are the same as in Specific Example 1 and the weights W are changed. In the table, "Ideal/Weight" indicates the weight W. From the results in Table 3, it can be seen that the output "−0.354" of the correction calculation unit can be obtained even if the weight W is changed.

TABLE 3

| Input case1 | Ideal Weight | MAC | Input G_ref | MAC | DW G_weight | MAC | Comp. MAC |
|---|---|---|---|---|---|---|---|
| 1 | 0.4 | 0.3 | 0.12 | 0.000001 | 0.0000004 | 0.0000018 | 7.2E−07 |
| 2 | 0.1 | 0.5 | 0.05 | 0.000001 | 0.0000001 | 0.000002 | 0.0000002 |
| 3 | 0.2 | −0.25 | −0.05 | 0.000001 | 0.0000002 | 0.00000125 | 2.5E−07 |
| 4 | 0.8 | −0.08 | −0.064 | 0.000001 | 0.0000008 | 0.00000142 | 1.136E−06 |
| 5 | 1 | −0.41 | −0.41 | 0.000001 | 0.000001 | 0.00000109 | 1.09E−06 |
| sum | 2.5 | 0.06 | −0.354 | | 0.0000025 | | 3.396E−06 | −0.354 |

Specific Example 4

Table 4 shows a case where the range of G, the input values, and the weights W are the same as in Specific Example 1, and Gmax is used as (G_Ref). From the results in Table 4, it can be seen that the output "0.3" of the correction calculation unit can be obtained even if (G_Ref) is changed.

TABLE 4

| Input case1 | Ideal Weight | MAC | Input G_ref | MAC | DW G_weight | MAC | Comp. MAC |
|---|---|---|---|---|---|---|---|
| 1 | 0.4 | −0.2 | −0.08 | 0.000002 | 0.0000008 | 0.0000013 | 5.2E−07 |
| 2 | 0.1 | −0.4 | −0.04 | 0.000002 | 0.0000002 | 0.0000011 | 1.1E−07 |
| 3 | 0.2 | 0 | 0 | 0.000002 | 0.0000004 | 0.0000015 | 0.0000003 |
| 4 | 0.8 | −0.1 | −0.08 | 0.000002 | 0.0000016 | 0.0000014 | 1.12E−06 |
| 5 | 1 | 0.5 | 0.5 | 0.000002 | 0.000002 | 0.000002 | 0.000002 |
| sum | 2.5 | −0.2 | 0.3 | | 0.000005 | | 4.05E−06 | 0.3 |

Specific Example 5

Table 5 shows a case where the input value, the weight W, and (G_Ref) are the same as in Specific Example 1, and the range of G is changed from 1 μS to 3 μSn. When the range of the conductance G of the variable resistance elements is 1 μS to 3 μS, the conductance G and the weight W of the variable resistance element has a relationship W=G×0.5×$10^6$−1. Therefore, the above Equation (3) can be rewritten as follows.

$$W \times (\text{Input}) = G \times (\text{Input}) \times 0.5 \times 10^6 - 1 \times (\text{Input}) \div (G\_\text{Ref}) \quad (4)$$

From the results in Table 5, it can be seen that the output "0.3" of the correction calculation unit is obtained by using the above Equation (4) even when the range of the conductance G of the variable resistance elements is different.

TABLE 5

| Input case1 | Ideal | | Input | | DW | | |
|---|---|---|---|---|---|---|---|
| | Weight | MAC | G_ref | MAC | G_weight | MAC | Comp. MAC |
| 1 | 0.4 | −0.2 | −0.08 | 0.000001 | 0.0000004 | 0.0000016 | 6.4E−07 |
| 2 | 0.1 | −0.4 | −0.04 | 0.000001 | 0.0000001 | 0.0000012 | 1.2E−07 |
| 3 | 0.2 | 0 | 0 | 0.000001 | 0.0000002 | 0.000002 | 0.0000004 |
| 4 | 0.8 | −0.1 | −0.08 | 0.000001 | 0.0000008 | 0.0000018 | 1.44E−06 |
| 5 | 1 | 0.5 | 0.5 | 0.000001 | 0.000001 | 0.000003 | 0.000003 |
| sum | 2.5 | −0.2 | 0.3 | | 0.0000025 | | 0.0000056 | 0.3 |

Figure 6:
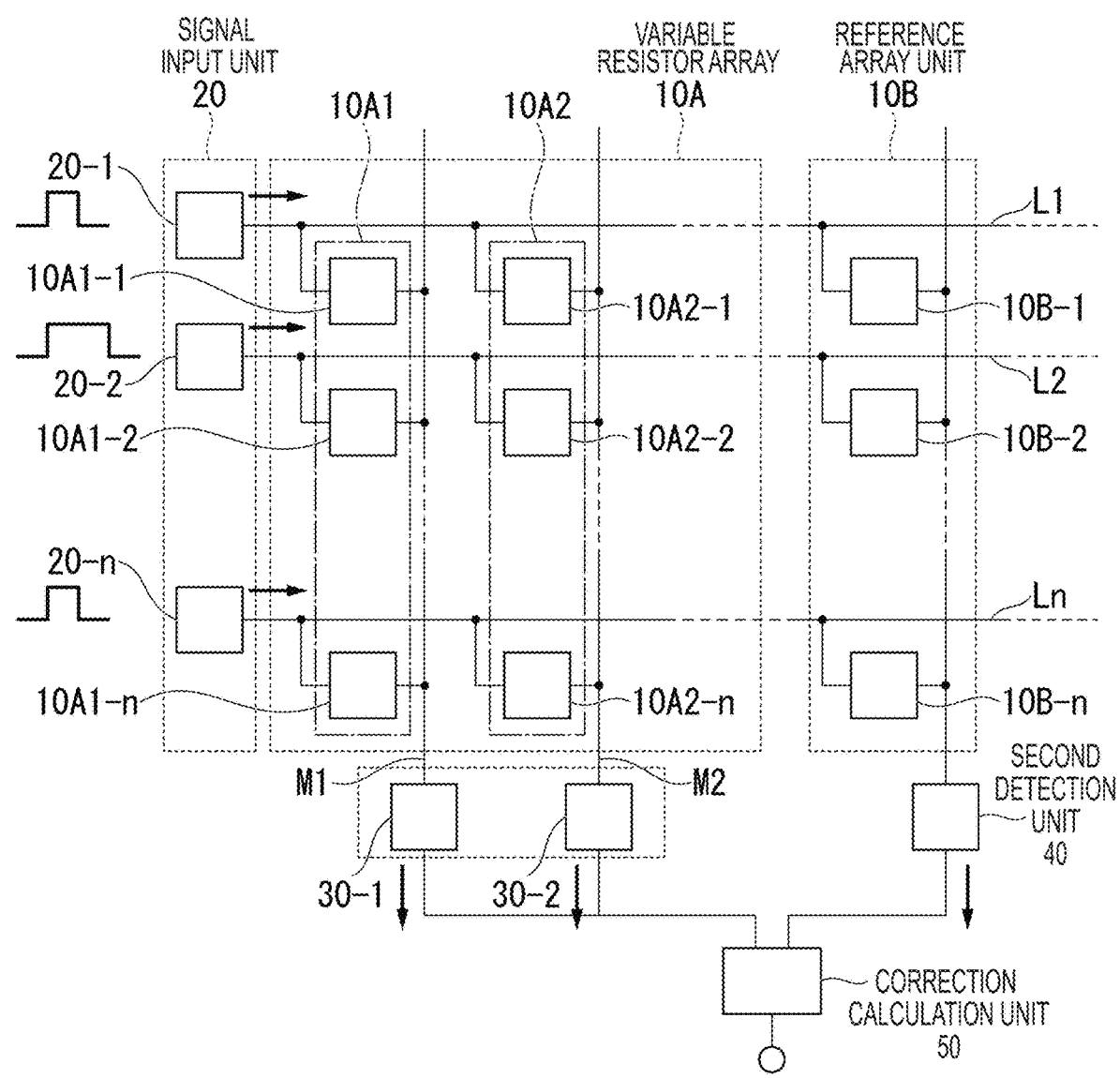
FIG. 6 is a diagram representing a modification example of the multiply and accumulate calculation device of FIG. 1.

FIG. 6 is a diagram showing a modification example of the multiply and accumulate calculation device 1 of FIG. 1. In FIG. 1, the multiply and accumulate calculation device 1 includes a plurality of correction calculation units 50-1, 50-2, . . . , but without being limited to this, one correction calculation unit may be provided.

Specifically, as shown in FIG. 6, a plurality of first detection units 30-1, 30-2, . . . detect outputs from the plurality of variable resistor columns 10A1, 10A2, . . . . Then, one correction calculation unit 50 performs a calculation on a plurality of outputs from the plurality of first detection units 30-1, 30-2, . . . . In this way, since the plurality of first detection units 30-1, 30-2, . . . share one correction calculation unit 50, it is possible to reduce the mounting area of the array.

As described above, according to the present embodiment, the multiply and accumulate calculation device 1 includes a variable resistor array unit 10A including a plurality of variable resistance elements (for example, 10A1 to 10A1-n), a reference array unit 10B including a reference resistance element (for example, 10B-1) having a fixed resistance value, a signal input unit 20 that generates an input signal from input data, and inputs the input signal to the plurality of variable resistance elements and the reference resistance element, a first detection unit 30 that detects a current flowing through the variable resistor array unit 10A, based on the input signal applied to the plurality of variable resistance elements, a second detection unit 40 that detects a current flowing through the reference array unit 10B, based on the input signal applied to the reference resistance element, and a correction calculation unit 50 that performs a predetermined calculation on the output from the first detection unit 30, based on the output from the second detection unit 40. According to the present configuration, an input value is input to the variable resistor array unit 10A, an input value is input to the reference array unit 10B having a fixed resistor, correction values corresponding to the input values are simultaneously obtained, and a predetermined calculation is performed based on the correction value obtained from the output of the variable resistor array unit 10A. Therefore, it is possible to impart positive and negative weights W to one variable resistance element, it is not necessary to provide two variable resistance elements in charge of the positive and negative for each weight of the neural network, which reduces the mounting area of the variable resistance element. Therefore, it is possible to perform a calculation in consideration of positive and negative weights W by one variable resistance element, and it is possible to achieve simplification and miniaturization of the apparatus. Further, since the multiply and accumulate calculation with less error can be performed, the performance of the logical calculation device can be improved.

[Configuration of Multiply and Accumulate Calculation Device According to Second Embodiment]

Figure 7:
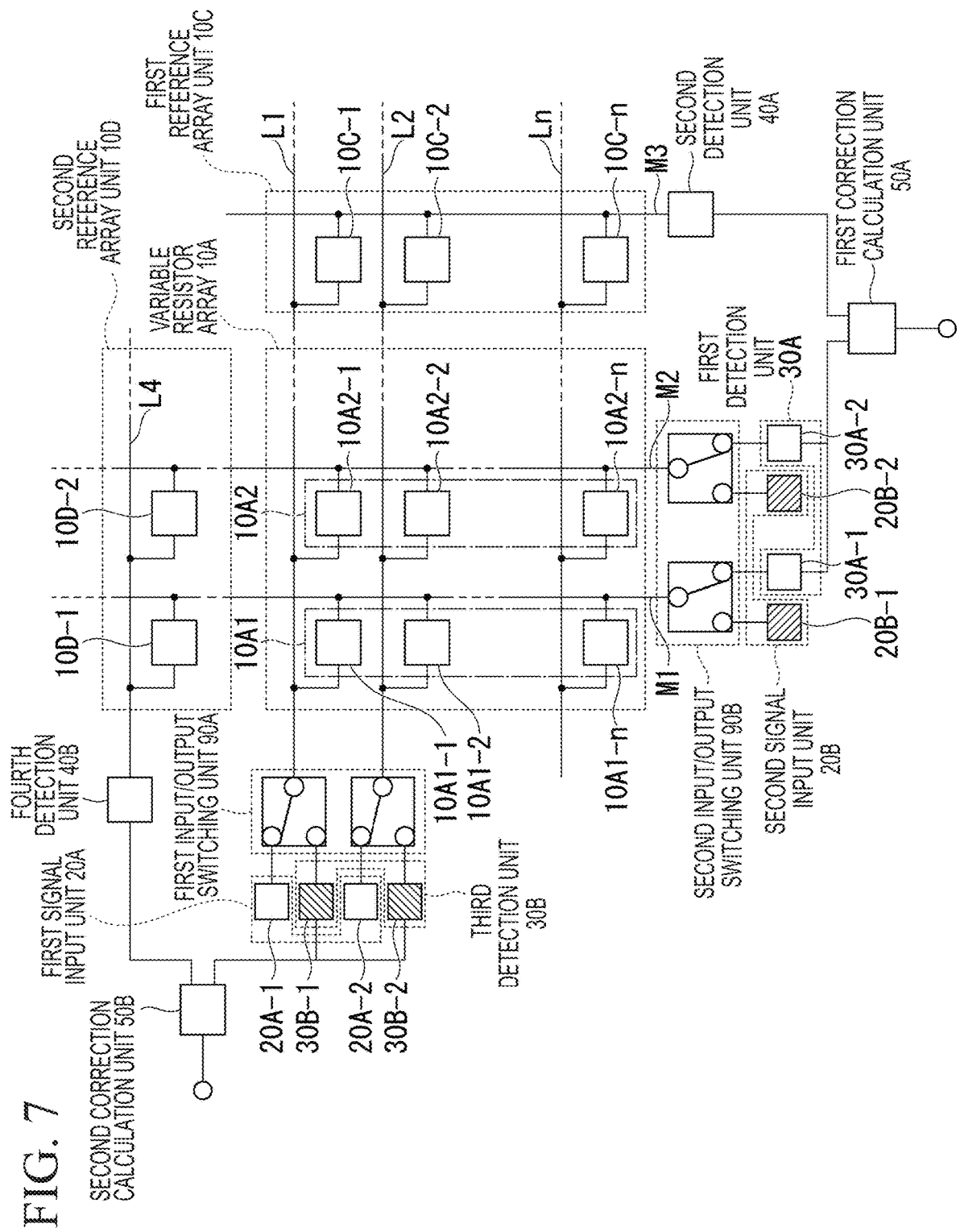
FIG. 7 is a diagram representing an example of a configuration of a multiply and accumulate calculation device of a second embodiment of the present invention.

FIG. 7 is a diagram representing an example of a configuration of a multiply and accumulate calculation device according to a second embodiment of the present invention.

As shown in FIG. 7, a multiply and accumulate calculation device 2 includes a variable resistor array unit 10A, a first reference array unit 10C, a second reference array unit 10D, a first signal input unit 20A, a second signal input unit 20B, and a first detection unit 30A, a second detection unit 40A, a third detection unit 30B, a fourth detection unit 40B, a first correction calculation unit 50A, a second correction calculation unit 50B, a first input/output switching unit 90A, and a second input/output switching unit 90B.

The variable resistor array unit 10A has a plurality of variable resistor columns 10A1, 10A2, . . . each having a plurality of variable resistance elements. Since the configuration of the variable resistor array unit 10A is the same as that of the first embodiment, the description thereof will be omitted.

The first reference array unit 10C is a reference column having a plurality of reference resistance elements 10C-1, 10C-2, . . . , and 10C-n (n is a natural number) each having a fixed resistance value. In FIG. 7, the first reference array unit 10C has a plurality of reference resistance elements 10C-1, 10C-2, . . . , and, 10Cn, but without being limited to this, may include a single reference resistance element having a fixed resistance value.

The second reference array unit 10D is a reference row having a plurality of reference resistance elements 10D-1, 10D-2, . . . , each having a fixed resistance value. In FIG. 7, the second reference array unit 10D has a plurality of reference resistance elements 10D-1, 10D-2, . . . , but without being limited to this, may include a single reference resistance element having a fixed resistance value.

The first signal input unit 20A is connected to the input side of the variable resistor array unit 10A, generates a first input signal from input data, and inputs the first input signal to a plurality of variable resistance elements and the reference resistance elements of the reference column.

In the present embodiment, the first signal input unit 20A includes a plurality of first signal input units 20A-1, 20A-2, . . . . The first signal input unit 20A-1 is connected to a plurality of variable resistance elements 10A1-1, 10A2-1, . . . , and a reference resistance element 10C-1 via a line L1. The first signal input unit 20A-2 is connected to a plurality of variable resistance elements 10A1-2, 10A2-2, . . . , and a reference resistance element 10C-2 via a line L2.

Then, the first signal input unit 20A-1 inputs the first input signal to the plurality of variable resistance elements 10A1-1, 10A2-1, . . . , and the reference resistance element 10C-1. The first signal input unit 20A-2 also inputs the first input signal to the plurality of variable resistance elements 10A1-2, 10A2-2, . . . , and the reference resistance elements 10C-2 in the same manner as described above.

In FIG. 7, the first signal input unit 20A includes a plurality of first signal input units 20A-1, 20A-2, . . . , but without being limited thereto, may include a single first signal input unit.

The first input signal for the plurality of variable resistance elements and the reference resistance element is, for example, a pulse width modulation signal (hereinafter, also referred to as PWM signal) or a pulse amplitude modulation signal (hereinafter, also referred to as PAM signal). In this case, the first signal input unit 20A inputs a PWM signal or a PAM signal based on the input data.

The first detection unit 30A is connected to the output side of the variable resistor array unit 10A, and detects a current flowing through the variable resistor array unit 10A, based on the first input signal applied to the plurality of variable resistance elements. In the present embodiment, the first detection unit 30A includes a plurality of first detection units 30A-1, 30A-2, . . . . The first detection unit 30A-1 is connected to a plurality of variable resistance elements 10A1-1, 10A1-2, . . . , and 10A1-$n$ via a line M1. The first detection unit 30A-2 is connected to a plurality of variable resistance elements 10A2-1, 10A2-2, . . . , and 10A2-$n$ via a line M2.

The first detection unit 30A-1 detects the current flowing through the variable resistor column 10A1, based on the first input signal applied to the plurality of variable resistance elements 10A1-1, 10A1-2, . . . , and 10A1-$n$. In the same manner as described above, the first detection unit 30A-2 also detects the current flowing through the variable resistor column 10A2, based on the first input signal applied to the plurality of variable resistance elements 10A2-1, 10A2-2, . . . , and 10A2-$n$ ($n$ is a natural number). That is, the plurality of first detection units 30A-1, 30A-2, . . . detect the currents flowing through the plurality of variable resistor columns 10A1, 10A2, . . . , based on the first input signal.

In FIG. 7, the first detection unit 30A includes a plurality of first detection units 30A-1, 30A-2, . . . , but without being limited thereto, it may include a single first detection unit.

When the first signal input unit 20A inputs a PWM signal based on the input data, the first detection unit 30A can have a detection circuit based on a charge detection method. Further, when the first signal input unit 20A inputs a PAM signal based on the input data, the first detection unit 30A can have a detection circuit based on a current detection method. That is, when the input signal is a PWM signal, the output voltage value by charge detection can be used, and when the input signal is a PAM signal, the output voltage value by current detection can be used.

The second detection unit 40A is connected to the output side of the variable resistor array unit 10A, and detects a current flowing through the first reference array unit 10C, based on the first input signal applied to the reference resistance elements of the reference column. In the present embodiment, the second detection unit 40A is connected to the reference resistance elements 10C-1 to 10C-n via a line M3. Then, the second detection unit 40A detects the current flowing through the first reference array unit 10C, based on the first input signal applied to any of the plurality of reference resistance elements 10C-1 to 10C-n.

When the first signal input unit 20A outputs a PWM signal based on the input data, the second detection unit 40A can have a detection circuit based on a charge detection method. Further, when the first signal input unit 20A outputs a PAM signal based on the input data, the second detection unit 40A can have a detection circuit based on a current detection method.

The second signal input unit 20B is connected to the output side of the variable resistor array unit 10A, generates a second input signal from input data, and inputs the second input signal to plurality of variable resistance elements and the reference resistance elements of the reference row.

In the present embodiment, the second signal input unit 20B includes a plurality of second signal input units 20B-1, 20B-2, . . . . The second signal input unit 20B-1 is connected to a plurality of variable resistance elements 10A1-$n$, 10A2-2, 10A1-1 and a reference resistance element 10D-1 via a line M1. The second signal input unit 20B-2 is connected to a plurality of variable resistance elements 10A2-$n$, 10A2-2, 10A2-1 and a reference resistance element 10D-2 via a line M2.

Then, the second signal input unit 20B-1 inputs the second input signal to the plurality of variable resistance elements 10A1-$n$, 10A1-2, 10A-1 and the reference resistance element 10D-1. The second signal input unit 20B-2 also inputs the second input signal to the plurality of variable resistance elements 10A2-$n$, 10A2-2, 10A2-1 and the reference resistance element 10D-2 in the same manner as described above.

In FIG. 7, the second signal input unit 20B includes a plurality of second signal input units 20B-1, 20B-2, . . . , but without being limited thereto, may include a single second signal input unit.

The second input signal for the plurality of variable resistance elements and the reference resistance element is, for example, a pulse width modulation signal (hereinafter, also referred to as PWM signal) or a pulse amplitude modulation signal (hereinafter, also referred to as PAM signal). In this case, the second signal input unit 20B inputs a PWM signal or a PAM signal based on the input data.

The third detection unit 30B is connected to the input side of the variable resistor array unit 10A, and detects a current flowing through the variable resistor array unit 10A, based on the second input signal applied to the plurality of variable resistance elements. In the present embodiment, the third detection unit 30B includes a plurality of third detection units 30B-1, 30B-2, . . . . The third detection unit 30B-1 is connected to a plurality of variable resistance elements 10A1-1, 10A2-1, . . . , via the line L1. The third detection unit 30B-2 is connected to a plurality of variable resistance elements 10A1-2, 10A2-2, . . . , via the line L2.

The third detection unit 30B-1 detects the current flowing through the variable resistance element 10A1-1, based on the second input signal applied to the plurality of variable resistance elements 10A1-$n$, 10A1-2, and 10A-1. Similarly to the above, the third detection unit 30B-2 also detects the current flowing through the variable resistance element 10A1-2, based on the second input signal applied to the plurality of variable resistance elements 10A2-$n$, 10A2-2, and 10A2-1.

In FIG. 7, the third detection unit 30B includes a plurality of third detection units 30B-1, 30B-2, . . . , but without being limited thereto, it may include a single third detection unit.

When the second signal input unit 20B inputs a PWM signal based on the input data, the third detection unit 30B can have a detection circuit by a charge detection method. Further, when the second signal input unit 20B inputs a PAM signal based on the input data, the third detection unit 30B can have a detection circuit based on a current detection method. That is, when the input signal is a PWM signal, the output voltage value by charge detection can be used, and when the input signal is a PAM signal, the output voltage value by current detection can be used.

The fourth detection unit 40B is connected to the input side of the variable resistor array unit 10A, and detects a current flowing through the second reference array unit 10D, based on the second input signal applied to the reference resistance elements of the reference row. In the present embodiment, the fourth detection unit 40B is connected to the reference resistance elements 10D-1, 10D-2, ..., via the line L4. Then, the fourth detection unit 40B detects the current flowing through the second reference array unit 10D, based on the second input signal applied to any of the plurality of reference resistance elements 10D-1, 10D-2, ....

When the second signal input unit 20B outputs a PWM signal based on the input data, the fourth detection unit 40B can have a detection circuit based on a charge detection method. Further, when the second signal input unit 20B outputs a PAM signal based on the input data, the fourth detection unit 40B can have a detection circuit based on a current detection method.

The first correction calculation unit 50A performs a predetermined calculation on the output from the first detection unit 30A according to the output from the second detection unit 40A. In the present embodiment, the first correction calculation unit 50A includes one correction calculation unit, and is connected to the first detection units 30A-1, 30A-2 and the second detection unit 40A. Then, the first correction calculation unit 50A performs a predetermined calculation on the output of the first detection unit 30A-1, based on the output from the second detection unit 40A. Further, in the same manner as described above, the first correction calculation unit 50A performs a predetermined calculation on the output of the first detection unit 30A-2, based on the output from the second detection unit 40A.

In the present embodiment, the plurality of first detection units 30A-1, 30A-2, ... detect the currents flowing through the plurality of variable resistor columns. Then, one first correction calculation unit 50A performs a calculation on the plurality of outputs from the plurality of first detection units 30A-1, 30A-2, .... In this way, since the plurality of first detection units 30A-1, 30A-2, ... share one first correction calculation unit 50A, it is possible to reduce the mounting area of the array.

Further, the first correction calculation unit 50A can perform a multiply and accumulate calculation including positive and negative with one variable resistance element (for example, the variable resistance element 10A1-1) by performing the above-described digital process or analog process. In that case, since the configuration of the multiply and accumulate calculation device 2 and the configuration of the first correction calculation unit 50A are the same in the first embodiment (see FIGS. 2 and 3), the description thereof will be omitted.

The second correction calculation unit 50B performs a predetermined calculation on the output from the third detection unit 30B, according to the output from the fourth detection unit 40B. In the present embodiment, the second correction calculation unit 50B includes one correction calculation unit, and is connected to the third detection units 30B-1 and 30B-2 and the fourth detection unit 40B. Then, the second correction calculation unit 50B performs a predetermined calculation on the output of the third detection unit 30B-1, based on the output from the fourth detection unit 40B. Further, in the same manner as described above, the second correction calculation unit 50B can perform a predetermined calculation on the output of the third detection unit 30B-2, based on the output from the fourth detection unit 40B.

When the second correction calculation unit 50B performs a digital process, the multiply and accumulate calculation device 2 can further include, for example, a third conversion unit (not shown) that digitally converts the output from the third detection unit 30B and outputs the converted output to the second correction calculation unit 50B, and a fourth conversion unit (not shown) that digitally converts the output from the fourth detection unit 40B and outputs the converted output to the second correction calculation unit 50B (see FIG. 2).

At this time, the second correction calculation unit 50B performs a digital logical calculation, subtracts a value obtained by multiplying the output from the fourth detection unit 40B by a predetermined coefficient, from the output from the third detection unit 30B, and further multiplies the value obtained from the subtraction by the predetermined coefficient.

As a result, when reading the resistance values of a plurality of variable resistance elements (for example, 10A1-n to 10A1-1) from the variable resistor column (for example, 10A1) constituting the variable resistor array unit 10A, by inputting the second input signal from one second signal input unit (for example, the second signal input unit 20B-1), the correction results of the plurality of variable resistance elements can be obtained at once, and as a result, the weights W of the plurality of variable resistance elements can be read out at once, and back-propagation learning can be performed efficiently and quickly.

In a case where the second correction calculation unit 50B performs an analog process, the second correction calculation unit 50B may include a second amplifier circuit (not shown) that amplifies either one or both of the output from the third detection unit 30B and the output from the fourth detection unit 40B and a second difference output circuit (not shown) that outputs the difference between the output from the third detection unit 30B and the output from the fourth detection unit 40B (see FIG. 3). In this case, the second correction calculation unit 50B outputs a value corresponding to a difference between values obtained by multiplying the output from the third detection unit 30B and the output from the fourth detection unit 40B by a predetermined coefficient. Even by such an analog process of the second correction calculation unit 50B, back-propagation learning can be performed efficiently and quickly.

The first input/output switching unit 90A is connected to the input side of the variable resistor array unit 10A, and switches between the input from the first signal input unit 20A and the output to the third detection unit 30B. When the input is performed from the first signal input unit 20A, the first signal input unit 20A is connected to the lines L1, L2, ..., and Ln by the first input/output switching unit 90A. On the other hand, when the output to the third detection unit 30B is performed, the third detection unit 30B is connected to the lines L1, L2, ..., and Ln.

The second input/output switching unit 90B is connected to the output side of the variable resistor array unit 10A, and switches between the input from the second signal input unit 20B and the output to the first detection unit 30A. When the input is performed from the second signal input unit 20B, the second signal input unit 20B is connected to the lines M1, M2, . . . , by the second input/output switching unit 90B. On the other hand, when the output to the first detection unit 30A is performed, the first detection unit 30A is connected to the lines M1, M2, . . . .

[Operation of Multiply and Accumulate Calculation Device According to the Second Embodiment]

Figure 8:
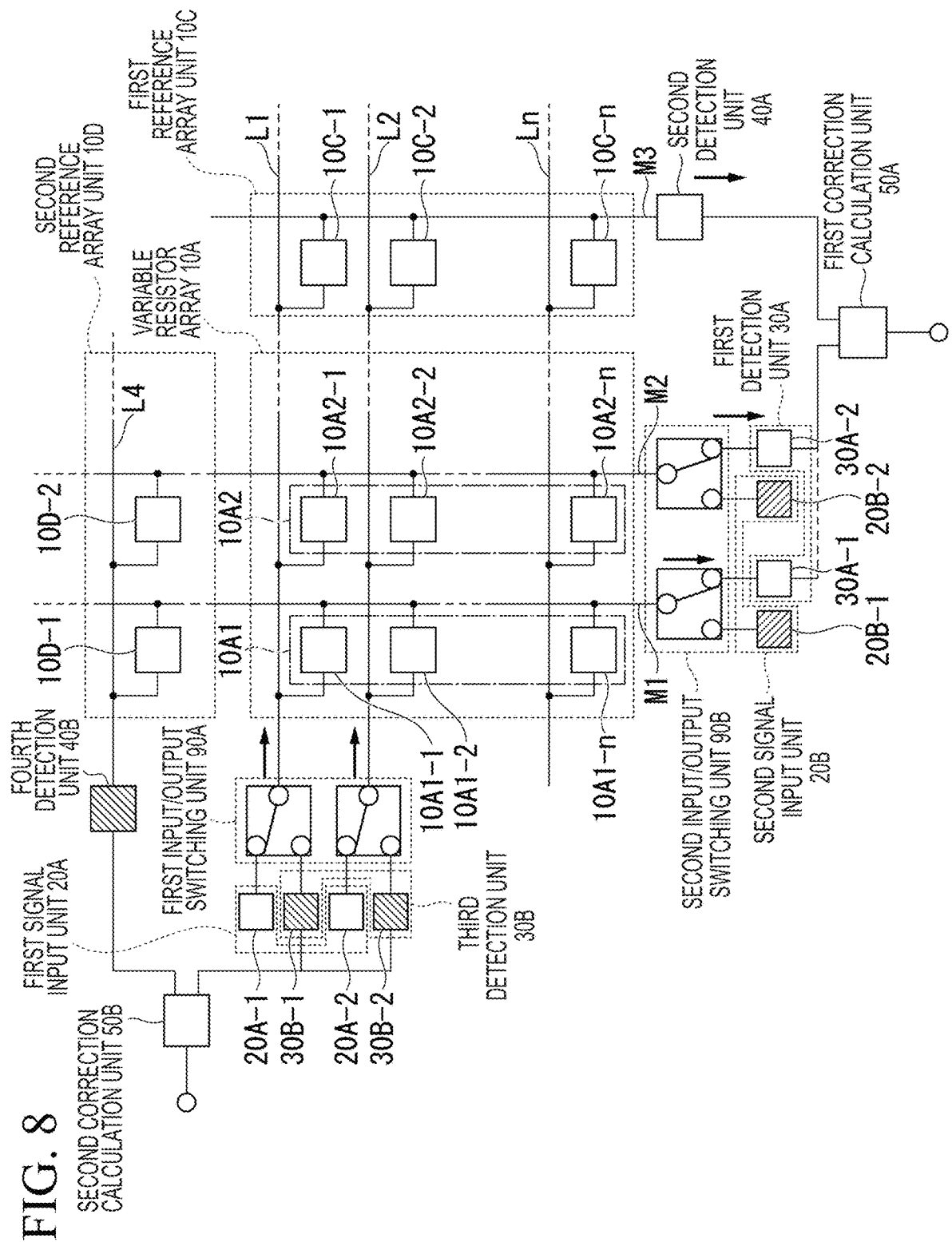
FIG. 8 is a diagram showing the forward operation of the multiply and accumulate calculation device in FIG. 7.

FIG. 8 is a diagram showing the forward operation of the multiply and accumulate calculation device 2 in FIG. 7. The forward operation of the multiply and accumulate calculation device 2 is the same as the operation of the multiply and accumulate calculation device 1 except that switching is performed first by the first input/output switching unit 90A and the second input/output switching unit 90B.

That is, first, when the forward operation is performed, the first input/output switching unit 90A is operated to connect the first signal input unit 20A to the lines L1, L2, . . . , and Ln. Further, the second input/output switching unit 90B is operated to connect the first detection unit 30A to the lines M1, M2, . . . .

Then, the first signal input unit 20A generates a first input signal from the input data, inputs the first input signal to a plurality of variable resistance elements (for example, 10A1-1, 10A2-1, . . . ) constituting a variable resistor array unit 10A, and inputs the input signal to a reference resistance element (for example, 10C-1) having a fixed resistance value. As described above, in the present embodiment, the first input signal is input as the PWM signal or the PAM signal, almost at the same time to the variable resistor array unit 10A that performs the multiply and accumulate calculation and the first reference array unit 10C that calculates the correction value.

When the first input signal is input to the variable resistor array unit 10A, the variable resistor array unit 10A outputs the result of the multiply and accumulate calculation, depending on the conductivity G of each of the variable resistance elements (for example, 10A1-1, 10A1-2, . . . ). When the input signal is input to the first reference array unit 10C, each reference resistance element (for example, 10C-1) outputs a unique output value according to the input value of the input signal.

Next, the first detection unit 30A detects the current flowing through the variable resistor array unit 10A, based on the first input signal applied to the plurality of variable resistance elements (for example, 10A1-1, 10A2-1, . . . ), and detects the current flowing through the first reference array unit 10C, based on the first input signal applied to the reference resistance element (for example, 10C-1).

After that, the first correction calculation unit 50A performs a predetermined calculation on an output according to a detection result of the current flowing through the variable resistor array unit 10A, based on the output according to a detection result of the current flowing through the first reference array unit 10C. For example, based on the outputs from the first detection unit 30A and the second detection unit 40A, as a predetermined calculation, for example, the output of the first correction calculation unit 50A, that is, the correction result is obtained by the above equation (1).

Figure 9:
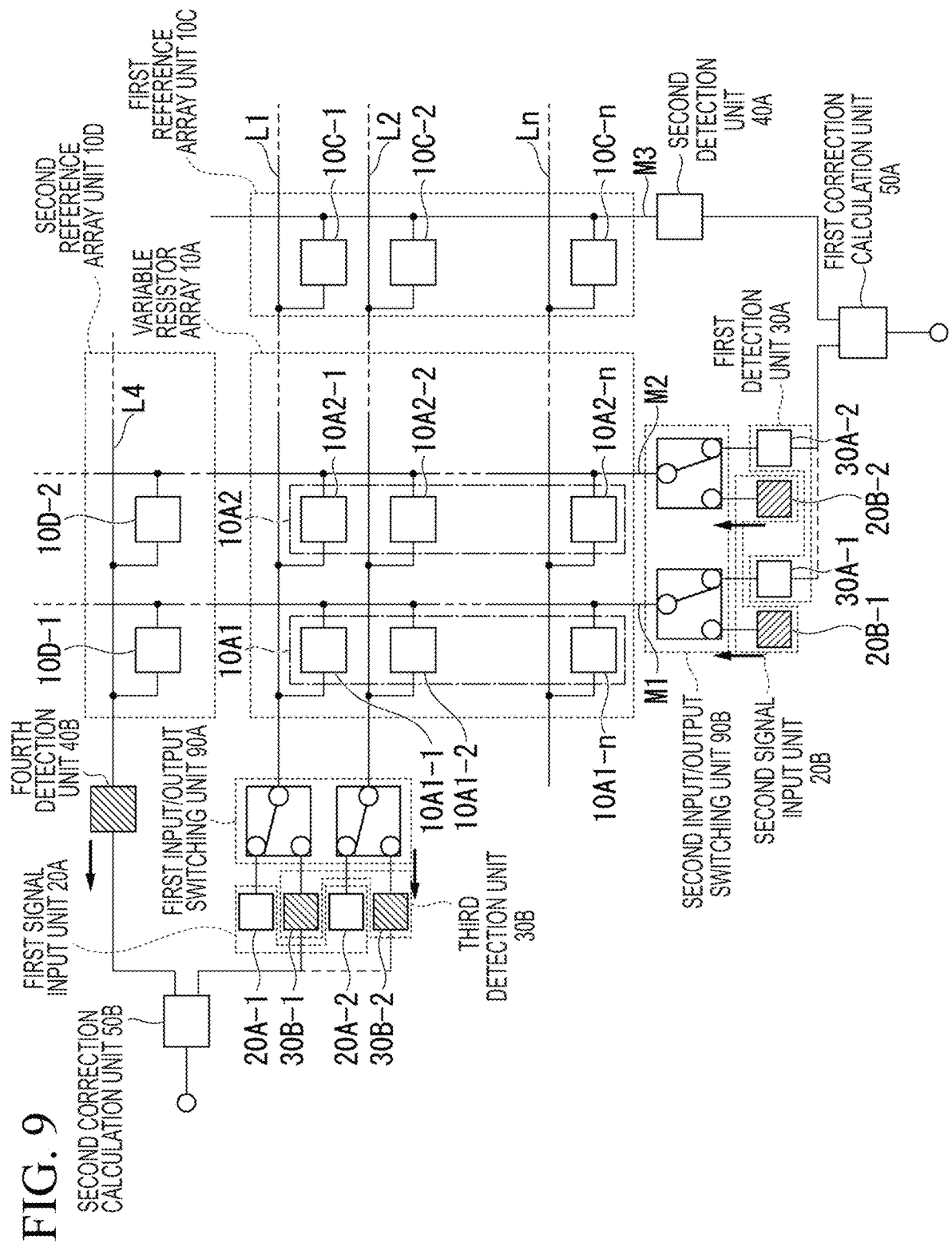
FIG. 9 is a diagram showing the backward operation of the multiply and accumulate calculation device in FIG. 7.

FIG. 9 is a diagram showing the backward operation of the multiply and accumulate calculation device 2 in FIG. 7.

When the backward operation is performed, first, the first input/output switching unit 90A is operated, and the third detection unit 30B is connected to the lines L1, L2, . . . , and Ln. Further, the second input/output switching unit 90B is operated, and the second signal input unit 20B is connected to the lines M1, M2, . . . .

Then, the second signal input unit 20B generates a second input signal from the input data, inputs the second input signal to a plurality of variable resistance elements (for example, 10A1-n to 10A1-1) constituting a variable resistor array unit 10A, and inputs the second input signal to a reference resistance element (for example, 10D-1) having a fixed resistance value. As described above, in the present embodiment, the second input signal is input almost at the same time to the variable resistor array unit 10A that performs the multiply and accumulate calculation and the second reference array unit 10D that calculates the correction value.

When the second input signal is input to the variable resistor array unit 10A, the variable resistor array unit 10A outputs the result of the multiple calculations, according to the conductivity G of each of the variable resistance elements (for example, 10A1-n, 10A1-2, 10A1-1). Further, when the second input signal is input to the second reference array unit 10D, each reference array unit 10B (for example, 10D-1) outputs a unique output value according to the input value of the second input signal.

Next, the third detection unit 30B detects the current flowing through the variable resistor array unit 10A based on the second input signal applied to the plurality of variable resistance elements (for example, 10A1-n to 10A1-1), and detects the current flowing through the second reference array unit 10D based on the second input signal applied to the reference resistance element (for example, 10D-1).

After that, the second correction calculation unit 50B performs a predetermined calculation on an output according to a detection result of the current flowing through the variable resistor array unit 10A, based on the output according to a detection result of the current flowing through the second reference array unit 10D. For example, based on the outputs from the third detection unit 30B and the fourth detection unit 40B, the output of the second correction calculation unit 50B, that is, the correction result is obtained as a predetermined calculation.

As described above, according to the present embodiment, it is possible to perform a calculation in consideration of positive and negative weights by one variable resistance element, in the forward operation of the multiply and accumulate calculation device 2, and it is possible to achieve simplification and miniaturization of the apparatus. Further, in the backward operation of the multiply and accumulate calculation device 2, when reading the resistance values of the plurality of variable resistance elements (for example, 10A1-n to 10A1-1) from the variable resistor column (for example, 10A1) constituting the variable resistor array unit 10A, based on the second input signal from one second signal input unit (for example, 20B-1), the correction results of the plurality of variable resistance elements can be obtained at once, and back-propagation learning can be performed efficiently and quickly. Further, by inputting the second input signal from one second signal input unit, a plurality of weights W corresponding to the plurality of variable resistance elements can be obtained at once, so that during back-propagation learning, the resistance values of a plurality of variable resistance elements can be corrected efficiently and quickly.

In the present embodiment, the multiply and accumulate calculation device 2 includes the first reference array unit 10C and the second reference array unit 10D, but is not limited thereto. The multiply and accumulate calculation device 2 may not include the first reference array unit 10C including a reference column, and may include a second reference array unit 10D including a reference row. The same effect as described above can be obtained by the present configuration as well.

Figure 10:
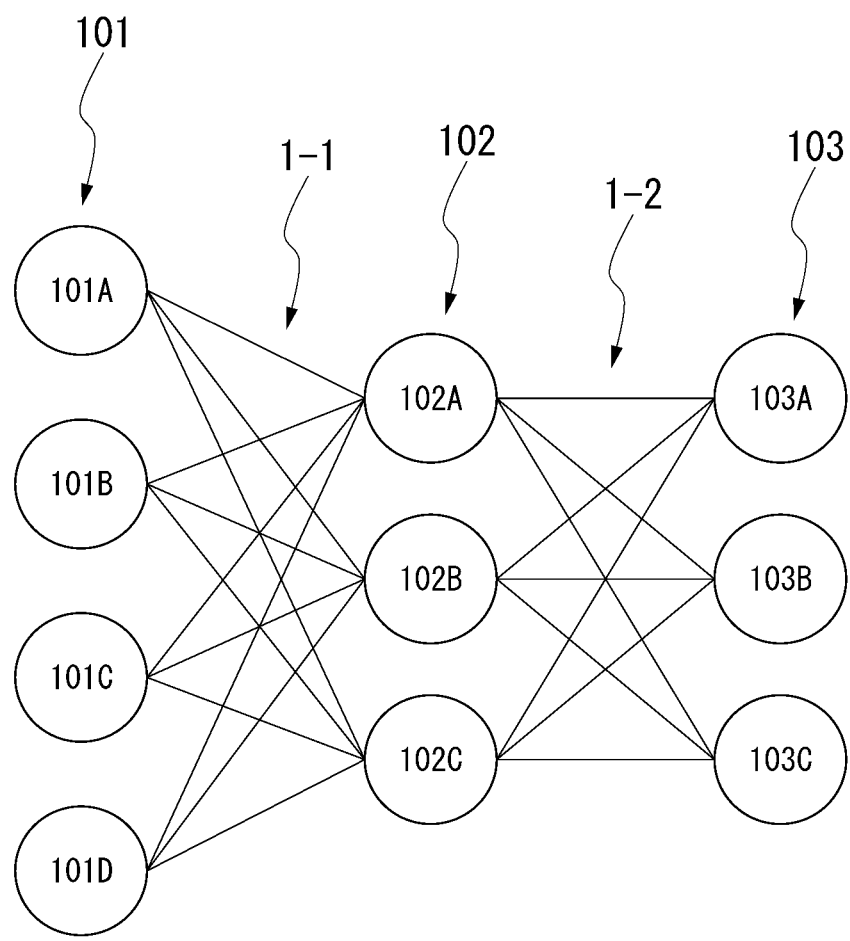
FIG. 10 is a schematic diagram representing an example of a configuration of a neural network executed on a neuromorphic device including the multiply and accumulate calculation device of FIG. 1.

FIG. 10 is a schematic diagram representing an example of a neural network executed on a neuromorphic device including the multiply and accumulate calculation device 1 of FIG. 1. The multiply and accumulate calculation device of the above embodiment can be applied to, for example, a neuromorphic device.

As shown in FIG. 10, the neural network 100 includes an input layer 101, a hidden layer 102, an output layer 103, a multiply and accumulate calculation device 1-1 that performs the calculation for the hidden layer 102, and a multiply and accumulate calculation device 1-2 that performs the calculation for the output layer 103. The multiply and accumulate calculation devices 1-1 and 1-2 have the same configuration as the multiply and accumulate calculation device 1 of the first embodiment of FIG. 1, and have a plurality of variable resistance elements.

The input layer 101 includes, for example, four nodes 101A, 101B, 101C, and 101D. The hidden layer 102 includes, for example, three nodes 102A, 102B, and 102C. The output layer 103 includes, for example, three nodes 103A, 103B, and 103C.

The multiply and accumulate calculation device 1-1 performs a calculation between the input layer 101 and the hidden layer 102, and is connected to the four nodes 101A, 101B, 101C, and 101D of the input layer 101 and the three nodes 102A, 102B, and 102C of the hidden layer 102. The multiply and accumulate calculation device 1-1 changes the weight W by changing the resistance values of the plurality of variable resistance elements shown in FIG. 1.

The multiply and accumulate calculation device 1-2 performs the calculation between the hidden layer 102 and the output layer 103. The multiply and accumulate calculation device 1-2 connects the three nodes 102A, 102B, and 102C of the hidden layer 102 and the three nodes 103A, 103B, and 103C of the output layer 103. The multiply and accumulate calculation device 1-2 changes the weight W by changing the resistance values of the plurality of variable resistance elements.

As described above, by applying the multiply and accumulate calculation devices 1-1 and 1-2 having the same configuration as the multiply and accumulate calculation device 1 of FIG. 1 to the neural network 100, the performance of the neural network can be improved by the multiply and accumulate calculation with less error. Further, by applying the multiply and accumulate calculation device 2 of FIG. 2 to the neural network 100, the same effect as described above can be obtained.

Although the embodiments of the present invention have been described in detail above, the present invention is not limited to the above embodiments, and various modifications and changes are made within the scope of the gist of the present invention described in the claims.

For example, a program for achieving the functions of the devices (for example, the multiply and accumulate calculation devices 1 and 2) according to the above-described embodiments is recorded on a computer-readable recording medium (storage medium), and the process may be performed by loading and executing the program recorded in the recording medium by a computer system.

The "computer system" referred to here may include an operating system (OS) or hardware such as peripheral apparatuses.

The "computer-readable recording medium" refers to a storage device such as a flexible disk, a magneto-optical disk, a read only memory (ROM), a writable non-volatile memory such as a flash memory, a portable medium such as a digital versatile disc (DVD), and a hard disk built into a computer system. Further, the recording medium may be, for example, a recording medium for temporarily recording data.

Further, the "computer-readable recording medium" includes those that hold the program for a certain period of time, such as a volatile memory (for example, a dynamic random access memory (DRAM)) inside a computer system that serves as a server or a client when a program is transmitted via a network such as the Internet or a communication line such as a telephone line.

Further, the above program may be transmitted from a computer system in which this program is stored in a storage device or the like to another computer system via a transmission medium or via a transmission wave in the transmission medium. Here, the "transmission medium" for transmitting a program refers to a medium having a function of transmitting information, such as a network (communication network) such as the Internet or a communication line such as a telephone line.

Further, the program may be for realizing a part of the above-described functions. Further, the program may be a so-called differential file (differential program) which achieves the above-described function in combination with programs already recorded in the computer system.

In a computer, for example, a processor such as a central processing unit (CPU) reads and executes a program stored in a memory.

REFERENCE SIGNS LIST

1: Multiply and accumulate calculation device
1-1: Multiply and accumulate calculation device
1-2: Multiply and accumulate calculation device
2: Multiply and accumulate calculation device
10A: Variable resistor array unit
10A1: Variable resistor column
10A1-1: Variable resistance element
10A1-2: Variable resistance element
10A1-$n$: Variable resistance element
10A2: Variable resistor column
10A2-1: Variable resistance element
10A2-2: Variable resistance element
10A2-$n$: Variable resistance element
10B: Reference array unit
10B-1: Reference resistance element
10B-2: Reference resistance element
10B-n: Reference resistance element
10C: First reference array unit
10C-1: Reference resistance element
10C-2: Reference resistance element
10C-n: Reference resistance element
10D: Second reference array unit
10D-1: Reference resistance element
10D-2: Reference resistance element
20: Signal input unit
20-1: Signal input unit
20-2: Signal input unit
20-$n$: Signal input unit
20A: First signal input unit
20A-1: First signal input unit
20A-2: First signal input unit
20B: Second signal input unit
20B-1: Second signal input unit
20B-2: Second signal input unit
30: First detection unit
30-1: First detection unit
30-2: First detection unit 30A: First detection unit
30A-1: First detection unit
30A-2: First detection unit
30B: Third detection unit
30B-1: Third detection unit
30B-2: Third detection unit
40: Second detection unit
40A: Second detection unit
40B: Fourth detection unit
50: Correction calculation unit
50-1: Correction calculation unit
50-2: Correction calculation unit
50A: First correction calculation unit
50B: Second correction calculation unit
51: Amplifier circuit
52: Amplifier circuit
53: Difference output circuit
60: First conversion unit
70: Second conversion unit
80: Third conversion unit
90A: First input/output switching unit
90B: Second input/output switching unit
100: Neural network
101: Input layer
101A: Node
101B: Node
101C: Node
101D: Node
102: Layer
102A: Node
102B: Node
102C: Node
103: Output layer
103A: Node
103B: Node
103C: Node

What is claimed is:

1. A multiply and accumulate calculation device comprising:
a variable resistor array having a plurality of variable resistance elements;
a first reference array of resistors including a reference column having a reference resistance element having a fixed resistance value;
a second reference array of resistors including a reference row having a reference resistance element having a fixed resistance value;
a first input signal generator connected to an input side of the variable resistor array, and configured to generate a first input signal from input data, and input the first input signal to the plurality of variable resistance elements and the reference resistance elements of the reference column;
a first sensor connected to an output side of the variable resistor array, and configured to detect a current flowing through the variable resistor array, based on the first input signal applied to the plurality of variable resistance elements, and output to a first correction calculation circuit;
a second sensor connected to the output side of the variable resistor array, and configured to detect a current flowing through the first reference array, based on the first input signal applied to the reference resistance elements of the reference column, and output to the first correction calculation circuit;
a second input signal generator connected to the output side of the variable resistor array, and configured to generate a second input signal from input data, and input the second input signal to the plurality of variable resistance elements and the reference resistance elements of the reference row;
a third sensor connected to the input side of the variable resistor array, and configured to detect a current flowing through the variable resistor array, based on the second input signal applied to the plurality of variable resistance elements, and output to a second correction calculation circuit;
a fourth sensor connected to the input side of the variable resistor array, and configured to detect a current flowing through the second reference array, based on the second input signal applied to the reference resistance elements of the reference row;
the first correction calculation circuit configured to perform a predetermined calculation on the output from the first sensor, based on the output from the second sensor;
the second correction calculation circuit configured to perform a predetermined calculation on the output from the third sensor, based on an output from the fourth sensor;
a first switch connected to the input side of the variable resistor array, and configured to switch between an input from the first input signal generator and an output to the third sensor; and
a second switch connected to the output side of the variable resistor array, and configured to switch between an input from the second input signal generator and an output to the first sensor,
wherein when a forward operation is performed, the first switch and the second switch are activated, and the first input signal generator generates a first input signal from input data and inputs the first input signal to the plurality of variable resistance elements and the reference resistance elements of the reference column, and
when a backward operation is performed, the first switch and the second switch are activated, and the second input signal generator generates a second input signal from input data and inputs the second input signal to the plurality of variable resistance elements and the reference resistance elements of the reference row.

2. The multiply and accumulate calculation device according to claim 1, further comprising:
a first analog to digital converter configured to digitally convert the output from the first sensor and output to the first correction calculation circuit; and
a second analog to digital converter configured to digitally convert the output from the second sensor and output to the first correction calculation circuit, wherein
the first correction calculation circuit subtracts a value obtained by multiplying the output from the second sensor by a predetermined coefficient, from the output from the first sensor, and further multiplies a value obtained from the subtraction by a predetermined coefficient, wherein
the first correction calculation circuit further comprises a first amplifier circuit and a first differential amplifier to implement subtraction and multiplication operations.

3. The multiply and accumulate calculation device according to claim 2, wherein an output of the first correction calculation circuit is determined by the following Equation (1), (Output of the first correction calculation circuit)={(Output of the first sensor)−(Output of the second sensor)×K1}×K2 ... (1)

here, K1 and K2 are coefficients.

4. The multiply and accumulate calculation device according to claim 1, wherein the first correction calculation circuit includes a first amplifier circuit configured to amplify one or both of the output from the first sensor and the output from the second sensor, and a first differential amplifier configured to output a difference between the output from the first sensor and the output from the second sensor, and outputs a value corresponding to a difference between values obtained by multiplying the output from the first sensor and the output from the second sensor by a predetermined coefficient.

5. The multiply and accumulate calculation device according to claim 1, wherein the first input signal generator inputs a pulse width modulation signal based on the input data, and the first sensor and the second sensor each have a detection circuit based on a charge detection method, using an output voltage value by charge detection.

6. The multiply and accumulate calculation device according to claim 1, wherein the first input signal generator inputs a pulse amplitude modulation signal, based on the input data, and the first sensor and the second sensor each have a detection circuit based on a current detection method, using an output voltage value by current detection.

7. The multiply and accumulate calculation device according to claim 1, further comprising:

a plurality of variable resistor columns each including the plurality of the variable resistance elements; and a plurality of the first sensors configured to detect currents flowing through the plurality of variable resistor columns, based on the first input signal, wherein the first correction calculation circuit performs a calculation on a plurality of outputs from the plurality of first sensors.

8. The multiply and accumulate calculation device according to claim 1, further comprising:

a third analog to digital converter configured to digitally convert the output from the third sensor and output the converted output to the second correction calculation circuit; and a fourth analog to digital converter configured to digitally convert the output from the fourth sensor and output the converted output to the second correction calculation circuit, wherein the second correction calculation circuit subtracts a value obtained by multiplying the output from the fourth sensor by a predetermined coefficient, from the output from the third sensor, and further multiplies a value obtained from the subtraction by a predetermined coefficient.

9. The multiply and accumulate calculation device according to claim 1, wherein the second correction calculation circuit includes a second amplifier circuit configured to amplify one or both of the output from the third sensor and the output from the fourth sensor, and a second differential amplifier configured to output a difference between the output from the third sensor and the output from the fourth sensor, and outputs a value corresponding to a difference between values obtained by multiplying the output from the third sensor and the output from the fourth sensor by a predetermined coefficient.

10. A neuromorphic device comprising a neural network, the neural network including:

an input layer, a hidden layer, an output layer, a first multiply and accumulate calculation device that performs calculation for the hidden layer, and a second multiply and accumulate calculation device that performs calculation for the output layer, wherein each of the first multiply and accumulate calculation device and the second multiply and accumulate calculation device comprises:

a variable resistor array having a plurality of variable resistance elements;

a first reference array of resistors including a reference column having a reference resistance element having a fixed resistance value;

a second reference array of resistors including a reference row having a reference resistance element having a fixed resistance value;

a first input signal generator connected to an input side of the variable resistor array, and configured to generate a first input signal from input data, and input the first input signal to the plurality of variable resistance elements and the reference resistance elements of the reference column;

a first sensor connected to an output side of the variable resistor array, and configured to detect a current flowing through the variable resistor array, based on the first input signal applied to the plurality of variable resistance elements, and output to a first correction calculation circuit;

a second sensor connected to the output side of the variable resistor array, and configured to detect a current flowing through the first reference array of resistors, based on the first input signal applied to the reference resistance elements of the reference column, and output to the first correction calculation circuit;

a second input signal generator connected to the output side of the variable resistor array, and configured to generate a second input signal from input data, and input the second input signal to the plurality of variable resistance elements and the reference resistance elements of the reference row;

a third sensor connected to the input side of the variable resistor array, and configured to detect a current flowing through the variable resistor array, based on the second input signal applied to the plurality of variable resistance elements, and output to a second correction calculation circuit;

a fourth sensor connected to the input side of the variable resistor array, and configured to detect a current flowing through the second reference array of resistors, based on the second input signal applied to the reference resistance elements of the reference row;

a first correction calculation circuit configured to perform a predetermined calculation on the output from the first sensor, based on the output from the second sensor;

a second correction calculation circuit configured to perform a predetermined calculation on the output from the third sensor, based on the output from the fourth sensor;

a first switch connected to the input side of the variable resistor array, and configured to switch between an input from the first input signal generator and an output to the third sensor; and a second switch connected to the output side of the variable resistor array, and configured to switch between an input from the second input signal generator and an output to the first sensor, wherein when a forward operation is performed, the first switch and the second switch are activated, and the first input signal generator generates a first input signal from input data and inputs the first input signal to the plurality of variable resistance elements and the reference resistance elements of the reference column, and when a backward operation is performed, the first switch and the second switch are activated, and the second input signal generator generates a second input signal from input data and inputs the second input signal to the plurality of variable resistance elements and the reference resistance elements of the reference row.

* * * * *